United States Patent
Otonari

(10) Patent No.: US 10,299,277 B2
(45) Date of Patent: May 21, 2019

(54) BASE STATION AND PROCESSING METHOD BY BASE STATION

(71) Applicant: FUJITSU LIMITED, Kawasaki-shi, Kanagawa (JP)

(72) Inventor: Junji Otonari, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 78 days.

(21) Appl. No.: 15/137,927

(22) Filed: Apr. 25, 2016

(65) Prior Publication Data

US 2016/0338063 A1     Nov. 17, 2016

(30) Foreign Application Priority Data

May 14, 2015  (JP) .................................. 2015-099179

(51) Int. Cl.
| | | |
|---|---|---|
| H04W 72/04 | (2009.01) | |
| H04L 5/00 | (2006.01) | |
| H04W 72/08 | (2009.01) | |

(52) U.S. Cl.
CPC ......... *H04W 72/0486* (2013.01); *H04L 5/001* (2013.01); *H04W 72/08* (2013.01)

(58) Field of Classification Search
CPC ................................................ H04W 72/0486
USPC ........................................................ 370/329
See application file for complete search history.

(56) References Cited

U.S. PATENT DOCUMENTS

| | | | | |
|---|---|---|---|---|
| 9,907,082 B2* | 2/2018 | Kobayashi | ............ | H04W 72/12 |
| 2012/0287911 A1* | 11/2012 | Takano | ............ | H04W 36/0088 |
| | | | | 370/332 |
| 2012/0327878 A1 | 12/2012 | Pedersen et al. | | |
| 2013/0034018 A1 | 2/2013 | Wei | | |
| 2015/0043466 A1* | 2/2015 | Yoshida | ................ | H04W 16/28 |
| | | | | 370/329 |
| 2016/0183263 A1* | 6/2016 | Liu | ....................... | H04W 24/02 |
| | | | | 370/329 |

FOREIGN PATENT DOCUMENTS

| | | |
|---|---|---|
| JP | 2012-019313 A | 1/2012 |
| JP | 2012-019314 A | 1/2012 |
| JP | 2013-520048 A | 5/2013 |
| JP | 2014-049932 A | 3/2014 |
| JP | 2014-150558 A | 8/2014 |

OTHER PUBLICATIONS

3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10), pp. 1-195, 3GPP TS 36.300 V10.11.0 (Sep. 2013).
Japanese Office Action of related Japanese Patent Application No. 2015-099179 dated Sep. 18, 2018.

* cited by examiner

*Primary Examiner* — Samina F Choudhry
(74) *Attorney, Agent, or Firm* — Arent Fox LLP

(57) ABSTRACT

A base station including: a memory, and a processor coupled to the memory and configured to: wirelessly communicate with one or more terminals via a plurality of component carriers of carrier aggregation, and allocate each of the plurality of component carriers to each of the one or more terminals based on both of each number of terminals allocated to each component carrier and each wireless quality of each component carrier for each terminal.

6 Claims, 18 Drawing Sheets

FIG. 2

| RADIO EQUIPMENT | RSRP[dBm] | |
| --- | --- | --- |
| | CC#1 | CC#2 |
| EQUIPMENT #1 | -60 | -80 |
| EQUIPMENT #2 | -70 | -81 |
| EQUIPMENT #3 | -61 | -85 |
| EQUIPMENT #4 | -63 | -80 |
| EQUIPMENT #5 | -62 | -70 |

FIG. 3

| RADIO EQUIPMENT | CC#1 | CC#2 |
|---|---|---|
| EQUIPMENT #1 | ○ | |
| EQUIPMENT #2 | ○ | |
| EQUIPMENT #3 | ○ | |
| EQUIPMENT #4 | ○ | |
| EQUIPMENT #5 | ○ | |

FIG. 4

| RADIO EQUIPMENT | CC#1 | CC#2 |
|---|---|---|
| EQUIPMENT #1 | ○ | |
| EQUIPMENT #2 | | ○ |
| EQUIPMENT #3 | ○ | |
| EQUIPMENT #4 | ○ | |
| EQUIPMENT #5 | | ○ |

FIG. 10

| RADIO EQUIPMENT | RSRP[dBm] | | |
|---|---|---|---|
| | CC#1 | CC#2 | CC#3 |
| EQUIPMENT #1 | -60 | -80 | -70 |
| EQUIPMENT #2 | -70 | -81 | -75 |
| EQUIPMENT #3 | -61 | -85 | -72 |
| EQUIPMENT #4 | -63 | -80 | -70 |
| EQUIPMENT #5 | -62 | -70 | -75 |
| EQUIPMENT #6 | -62 | -79 | -80 |

FIG. 11

| RADIO EQUIPMENT | EQUIPMENT-NUMBER DIFFERENCE | | | CC ALLOCATION RESULT | | |
|---|---|---|---|---|---|---|
| | $N_{UE1}-N_{UE2}$ | $N_{UE2}-N_{UE3}$ | $N_{UE3}-N_{UE1}$ | CC#1 | CC#2 | CC#3 |
| EQUIPMENT #1 | 0 | 0 | 0 | ○ | | |
| EQUIPMENT #2 | 1 | 0 | -1 | × | | ○ |
| EQUIPMENT #3 | 1 | -1 | 0 | × | ○ | × |
| EQUIPMENT #4 | 0 | 0 | 0 | ○ | | |
| EQUIPMENT #5 | 1 | 0 | -1 | × | ○ | |
| EQUIPMENT #6 | 0 | 1 | -1 | × | × | ○ |

FIG. 14

| RADIO EQUIPMENT | SINR[dB] | | |
|---|---|---|---|
| | CC#1 | CC#2 | CC#3 |
| EQUIPMENT #1 | 1 | 10 | 8 |
| EQUIPMENT #2 | 2 | 9 | 6 |
| EQUIPMENT #3 | 2 | 6 | 4 |
| EQUIPMENT #4 | 5 | 4 | 5 |
| EQUIPMENT #5 | 4 | 5 | 4 |
| EQUIPMENT #6 | 12 | 12 | 12 |

FIG. 15

| RADIO EQUIPMENT | SINR DIFFERENCE | | | CC ALLOCATION RESULT | | |
|---|---|---|---|---|---|---|
| | $R_{k,1}-R_{k,2}$ | $R_{k,2}-R_{k,3}$ | $R_{k,3}-R_{k,1}$ | CC#1 | CC#2 | CC#3 |
| EQUIPMENT #1 | -9 | 2 | 7 | × | ○ | |
| EQUIPMENT #2 | -7 | 3 | 4 | × | | ○ |
| EQUIPMENT #3 | -4 | 2 | 2 | × | ○ | |
| EQUIPMENT #4 | 1 | -1 | 0 | ○ | | ○ |
| EQUIPMENT #5 | -1 | 1 | 0 | | | |
| EQUIPMENT #6 | 0 | 0 | 0 | | ○ | |

BASE STATION AND PROCESSING METHOD BY BASE STATION

CROSS-REFERENCE TO RELATED APPLICATION

This application is based upon and claims the benefit of priority of the prior Japanese Patent Application No. 2015-099179, filed on May 14, 2015, the entire contents of which are incorporated herein by reference.

FIELD

The embodiments disclosed herein are related to a base station and a processing method by a base station.

BACKGROUND

A base station that carries out radio communications with plural pieces of radio equipment is known (for example, refer to Japanese Laid-open Patent Publications No. 2014-150558 and No. 2014-049932, and 3GPP TS 36.300 V10.11.0, "Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," [online], September 2013, [retrieved on Feb. 2, 2015], Internet <URL:http://www.3gpp.org/ftp/Specs/archive/36_series/36.300/36300-ab0.zip>). For example, the base station carries out communications in accordance with the LTE-Advanced system. LTE is an abbreviation of Long Term Evolution.

The LTE-Advanced system uses a carrier aggregation (CA) technique. In the CA technique, communications are carried out by using plural component carriers (CCs).

For example, the LTE-Advanced system uses up to five CCs. The frequency bandwidth possessed by one CC is at most 20 MHz. Therefore, in the LTE-Advanced system, communications are carried out by using a frequency bandwidth of up to 100 MHz. This can increase the amount of data transmitted per unit time (in other words, communication throughput).

SUMMARY

According to an aspect of the embodiment, a base station includes a memory, and a processor coupled to the memory and configured to: wirelessly communicate with one or more terminals via a plurality of component carriers of carrier aggregation, and allocate each of the plurality of component carriers to each of the one or more terminals based on both of each number of terminals allocated to each component carrier and each wireless quality of each component carrier for each terminal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a table representing one example of RSRP measured in pieces of radio equipment;

FIG. 3 is a table representing one example of CCs allocated to pieces of radio equipment;

FIG. 4 is a table representing one example of CCs allocated to pieces of radio equipment;

FIG. 10 is a table representing one example of RSRP measured in pieces of radio equipment;

FIG. 11 is a table representing one example of CCs allocated to pieces of radio equipment;

FIG. 14 is a table representing one example of SINR measured in pieces of radio equipment;

FIG. 15 is a table representing one example of CCs allocated to pieces of radio equipment;

DESCRIPTION OF EMBODIMENTS

Figure 1:
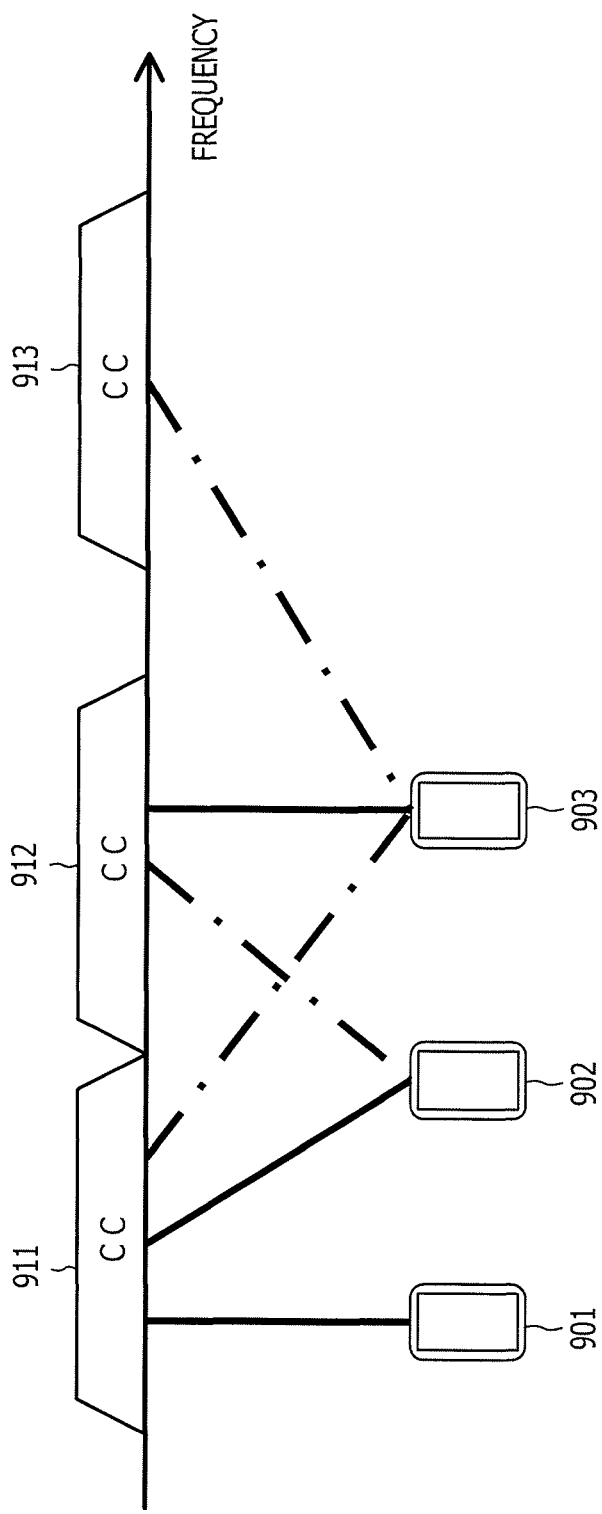
FIG. 1 is an explanatory diagram representing one example of CCs used by pieces of radio equipment.

For each piece of radio equipment, the above-described base station allocates, with higher priority, the CC with higher RSRP to communications with the radio equipment. RSRP is an abbreviation of Reference Signal Received Power. Therefore, the numbers of pieces of radio equipment that use the respective CCs often involve a bias. As a result, the communication throughput often decreases.

As one aspect, one of objects of the embodiments disclosed herein is to enhance the communication throughput.

Embodiments will be described below with reference to the drawings. However, the embodiments described below are exemplification. Therefore, it is not excluded that various modifications and techniques that are not clearly specified below are applied to the embodiments. In the drawings used in the following embodiments, a part given the same symbol represents the same or similar part unless a change or modification is clearly specified.

As represented in FIG. 1, for example, three pieces of radio equipment 901 to 903 carry out communications by using three CCs 911 to 913. The radio equipment may be represented as user equipment (UE). The UE 901 carries out communications by using the CC 911. The UE 902 carries out communications by using the CC 911 and the CC 912. The UE 903 carries out communications by using the CC 911, the CC 912, and the CC 913.

In the present example, the CC 911 is a primary component carrier (PCC) for each of the UE 901 and the UE 902. Furthermore, in the present example, the CC 912 is a PCC for the UE 903. Moreover, in the present example, the CC 912 is a secondary component carrier (SCC) for the UE 902. In addition, in the present example, each of the CC 911 and the CC 913 is an SCC for the UE 903.

The UE 902 and the UE 903 use two or more CCs and thus can carry out communications with higher communication throughput than the UE 901, which carries out communications by using one CC.

For example, the CCs used for communications between the respective pieces of radio equipment and a base station are allocated by the base station. Incidentally, the state of communications by the CC (for example, the quality of communications, the load of communications, and so forth) differs on each CC basis. Therefore, if the CCs are not properly selected, the communication throughput often decreases.

For example, the base station selects the CCs in accordance with a round-robin method in some cases. Furthermore, in other cases, on the basis of a parameter indicating the quality of communications (for example, RSRP, RSRQ, CQI, SINR, or other parameters indicating wireless quality), the base station allocates the CC with higher quality to radio equipment with higher priority. RSRQ is an abbreviation of Reference Signal Received Quality. CQI is an abbreviation of Channel Quality Indicator. SINR is an abbreviation of Signal to Interference plus Noise Ratio.

A description will be made about one example of operation in which, as represented in FIG. 2 and FIG. 3, a base station allocates one CC of two CCs to each of five pieces of radio equipment. In the present example, the k-th radio equipment is identified by equipment #k as an equipment identifier (in other words, equipment identification (ID)). k represents an integer of 1 to 5. The i-th CC is identified by CC #i as a CC identifier (in other words, CC ID). i represents an integer of 1 or 2.

FIG. 2 represents the RSRP of each CC about each piece of radio equipment. In the present example, regarding each piece of radio equipment, the RSRP about the first CC is higher than the RSRP about the second CC. Therefore, as represented in FIG. 3, the base station allocates the first CC to all pieces of radio equipment if the base station allocates, with higher priority, the CC with higher RSRP to each piece of radio equipment as the CC used for communications with the radio equipment. Circles in FIG. 3 represent that the CC is allocated to communications between the base station and the radio equipment. Circles in diagrams that represent tables similar to FIG. 3 and will be described later also represent that the CC is used for communications between the base station and the radio equipment similarly to FIG. 3.

In this case, the number of pieces of radio equipment that use the first CC is excessively large. As a result, the amount of radio resources that can be allocated to each piece of radio equipment becomes small in the first CC. Therefore, the communication throughput is not sufficiently enhanced in some cases.

Furthermore, it will be possible that the base station allocates the CC to each piece of radio equipment on the basis of the quality of communications and thereafter changes the CC allocated to part of the plural pieces of radio equipment so that the bias in the numbers of pieces of radio equipment that use the respective CCs may be suppressed. The case in which the RSRP of each CC about each piece of radio equipment is measured as represented in FIG. 2 will be assumed.

For example, first, for each piece of radio equipment, the base station allocates the CC with higher RSRP to communications with the radio equipment with higher priority. Therefore, as represented in FIG. 3, the base station allocates the first CC to each piece of radio equipment.

Thereafter, for example, the base station extracts the radio equipment regarding which the magnitude of the difference between the RSRP about the first CC and the RSRP about the second CC is relatively small. In the present example, the case in which the base station extracts the second and fifth pieces of radio equipment is assumed. In this case, as represented in FIG. 4, the base station changes the CC allocated to the extracted pieces of radio equipment from the first CC to the second CC.

This can suppress the bias in the numbers of pieces of radio equipment that use the respective CCs. As a result, the communication throughput can be enhanced.

Incidentally, the change (in other words, switching) of the CC is carried out in accordance with a procedure similar to a procedure of handover (HO) between cells.

Therefore, in the case of changing the CC, first, the quality of communications about the CC of the change destination is measured for each piece of radio equipment. For example, the measurement of the quality is carried out by a function of the radio equipment (for example, function called UE Measurement). In this case, transmission and reception of user data are stopped in the period during which the quality of communications is measured in some cases. Furthermore, a given time (for example, time of several minutes to several tens of minutes) is taken from issuance of an instruction of measurement to the completion of the measurement in some cases.

Moreover, in this case, a control signal to carry out the handover is transmitted and received and therefore the radio resources that can be allocated to transmission and reception of user data decrease in some cases. In addition, in this case, the communications between the radio equipment whose CC is changed and the base station stop in the period until the completion of the change of the CC in some cases.

Because of the above, the communication throughput decreases more readily as the frequency of the change of the CC increases.

Incidentally, in order to distribute the load of a macro base station, a large number of small base stations that form relatively-small cells (for example, picocells, femtocells, or the like) are disposed in some cases. Therefore, the cost of the radio communication system becomes high more readily as the cost of the small base stations becomes higher.

Furthermore, the processing load of the base station in association with the change of the CC is comparatively large. Therefore, as the frequency of the change of the CC increases, the cost of the base station becomes higher because it is preferable for the base station to have higher processing capability. In other words, the cost of the radio communication system becomes higher as the frequency of the change of the CC increases.

First Embodiment (Configuration)

Figure 5:
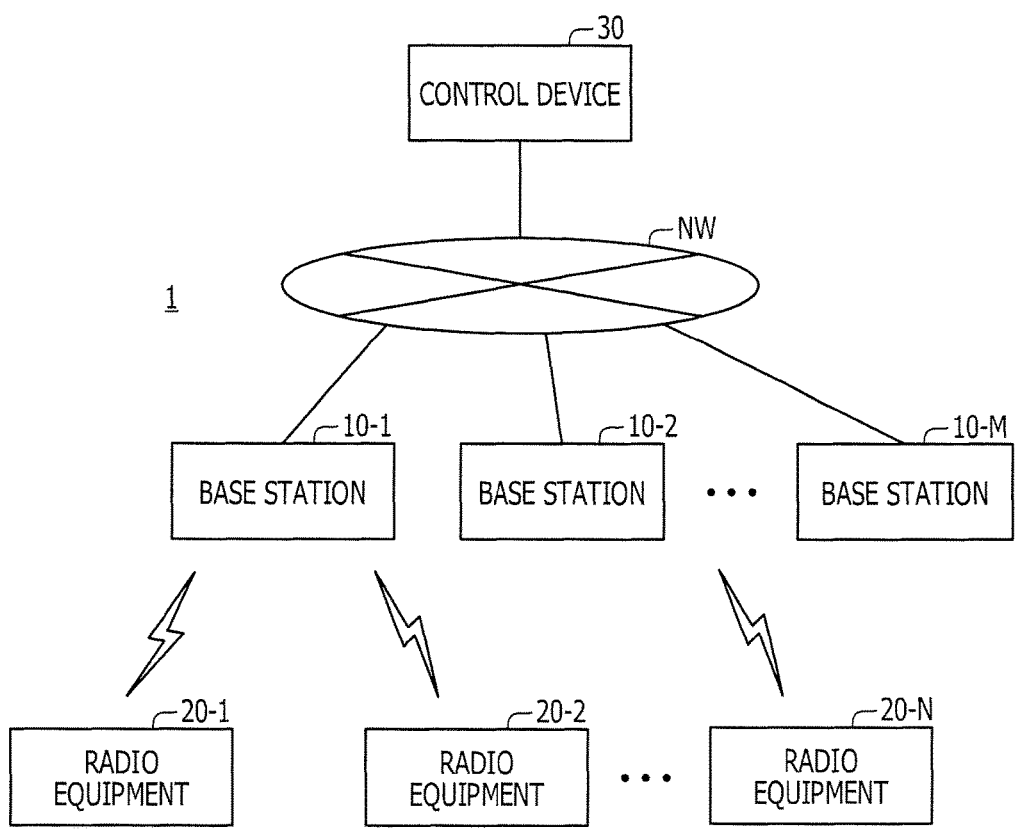
FIG. 5 is a block diagram representing one example of configuration of a radio communication system according to a first embodiment.

As represented in FIG. 5, a radio communication system 1 according to a first embodiment illustratively includes M base stations 10-1, 10-2, . . . , and 10-M, N pieces of radio equipment 20-1, 20-2, . . . , and 20-N, and a control device 30.

In the present example, M represents an integer equal to or larger than 2. Furthermore, hereinafter, the base station 10-*m* will be represented also as the base station 10 if there is no need for differentiation. m represents each integer from 1 to M. In the present example, N represents an integer equal to or larger than 2. Furthermore, hereinafter, the radio equipment 20-*n* will be represented also as the radio equipment 20 if there is no need for differentiation. n represents each integer from 1 to N.

In the radio communication system 1, radio communications in accordance with a given communication method are carried out between the base stations 10-*m* and the pieces of radio equipment 20-*n*. For example, the communication method is the LTE-Advanced system. The communication method may be a method different from the LTE-Advanced system.

The base station 10-*m* forms a radio area. The base station 10-*m* may form plural radio areas. The radio area may be represented as a coverage area or a communication area. Furthermore, the radio area may be represented as a cell. For example, the cell is a macrocell, microcell, nanocell, picocell, femtocell, home cell, small cell, sector cell, or the like.

The base station 10-*m* communicates, by radio, with the radio equipment 20-*n* located in the cell formed by this base station 10-*m*.

In the present example, the base station 10-*m* provides radio resources in the cell formed by this base station 10-*m*. In the present example, the radio resources are identified by the time and the frequency. The base station 10-*m* communicates with the radio equipment 20-*n* located in the cell formed by this base station 10-*m* by using the radio resources provided in this cell.

The base station 10-*m* may be represented as a radio communication device, evolved Node B (eNB), or Node B (NB).

In the present example, as represented in FIG. 5, the base stations 10-*m* are coupled to a communication network NW (for example, core network) with which the base stations 10-*m* can communicate in a wired or wireless manner. The interface between the base station 10-*m* and the communication network NW may be represented as an S1 interface. Furthermore, the interface between the base stations 10 may be represented as an X2 interface.

The part on the side of the communication network NW at a higher level than the base stations 10 in the radio communication system 1 may be represented as EPC. EPC is an abbreviation of Evolved Packet Core. The part formed by the base stations 10 in the radio communication system 1 may be represented as E-UTRAN. E-UTRAN is an abbreviation of Evolved Universal Terrestrial Radio Access Network.

The radio equipment 20-*n* communicates, by radio, with the base station 10-*m* that forms the cell in which this radio equipment 20-*n* is located by using the radio resources provided in this cell.

The radio equipment 20-*n* may be represented as a radio terminal, a radio device, or UE. The radio equipment 20-*n* may be carried by a user or be mounted on a moving body such as a vehicle or be fixed.

In the present example, the radio communication system 1 carries out CA by using plural CCs and thereby the base stations 10-*m* and the pieces of radio equipment 20-*n* communicate by radio.

The CC is a radio resource identified by a frequency band having a given frequency bandwidth. In the present example, the base station 10-*m* provides plural CCs different from each other in the frequency band. The number of CCs provided by the base station 10-*m* may be 1.

The plural CCs used for the CA include one PCC and at least one SCC. The plural CCs used for the CA are different from each other in the frequency band. For example, the frequency band of the PCC is the 800-MHz band and the frequency band of the SCC is the 2-GHz band. In the present example, the plural CCs used for the CA are provided by one base station 10-*m*. The plural CCs used for the CA may be provided by the plural base stations 10.

In the present example, the base station 10-*m* allocates the CCs provided by this base station 10-*m* to the radio equipment 20-*n* located in the cell formed by this base station 10-*m*. The allocation of the CCs may be carried out by a base station 10-*p* different from the base station 10-*m* that provides these CCs or the control device 30. p represents each integer from 1 to M different from m.

The radio equipment 20-*n* carries out the CA by using plural CCs allocated to this radio equipment 20-*n* to thereby communicate with the base station 10 that provides the respective CCs.

The control device 30 is coupled to the communication network NW in such a manner as to be capable of communicating with the communication network NW in a wired or wireless manner. In the present example, the control device 30 is communicably coupled to each base station 10 via the communication network NW. The control device 30 may be represented as a control station, a management device, a control server, or a management server. Furthermore, the control device 30 may include plural devices.

(Configuration; Base Station 10-*m*)

Next, the configuration of the base station 10-*m* will be described.

Figure 6:
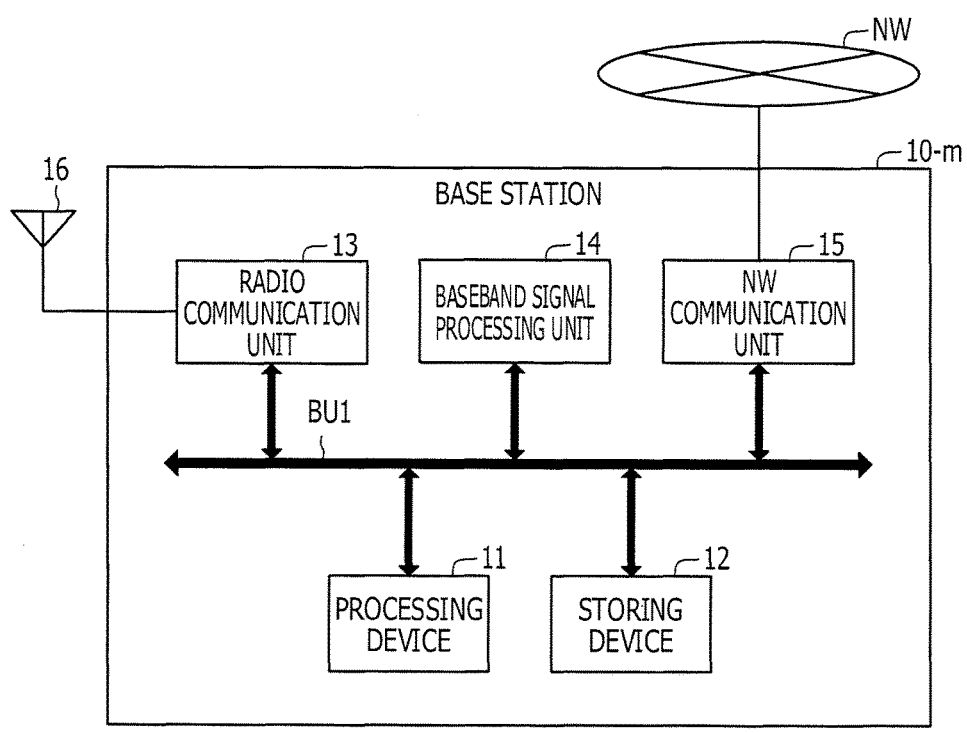
FIG. 6 is a block diagram representing one example of configuration of a base station in FIG. 5.

In the present example, as represented in FIG. 6, the base station 10-*m* includes a processing device 11, a storing device 12, a radio communication unit 13, a baseband signal processing unit 14, and a network (NW) communication unit 15 that are coupled to each other via a bus BU1.

The processing device 11 controls each unit in the base station 10-*m* in order to implement functions to be described later. In the present example, the processing device 11 is a central processing unit (CPU). In the present example, the processing device 11 implements the functions to be described later by executing a program stored in the storing device 12.

The functions of the processing device 11 may be implemented by large scale integration (LSI) or a programmable logic device (PLD).

The storing device 12 includes at least one of RAM, ROM, HDD, SSD, semiconductor memory, and organic memory for example. RAM is an abbreviation of Random Access Memory. ROM is an abbreviation of Read Only Memory. HDD is an abbreviation of Hard Disk Drive. SSD is an abbreviation of Solid State Drive. The storing device 12 may include a recording medium such as flexible disk, optical disk, magneto-optical disk, and semiconductor memory and a reading device that can read information from the recording medium.

The radio communication unit 13 has an antenna 16 and carries out communications in accordance with the above-described communication method with the radio equipment 20 located in a cell formed via the antenna 16. The radio communication unit 13 transmits a radio signal corresponding to an electrical signal input from the baseband signal processing unit 14 via the antenna 16. The radio communication unit 13 outputs an electrical signal corresponding to a radio signal received via the antenna 16 to the baseband signal processing unit 14. In the present example, functions of the radio communication unit 13 are implemented by LSI.

The baseband signal processing unit 14 executes given signal processing on the electrical signal generated by this baseband signal processing unit 14 and the electrical signal input from the radio communication unit 13. For example, the signal processing includes termination of a transmission signal, termination of a received signal, conversion of the communication protocol, and so forth.

In the present example, the baseband signal processing unit 14 implements functions to be described later by executing a program held by a digital signal processor (DSP) in advance. The functions of the baseband signal processing unit 14 may be implemented by LSI.

The NW communication unit 15 communicates with another device coupled to the communication network NW (for example, control device 30). For example, the NW communication unit 15 carries out communications in accordance with a wired local area network (LAN) system. For example, the wired LAN system is an IEEE 802.3 series or Ethernet (registered trademark) system. In the present example, functions of the NW communication unit 15 are implemented by LSI.

(Functions; Base Station 10-$m$)

Figure 7:
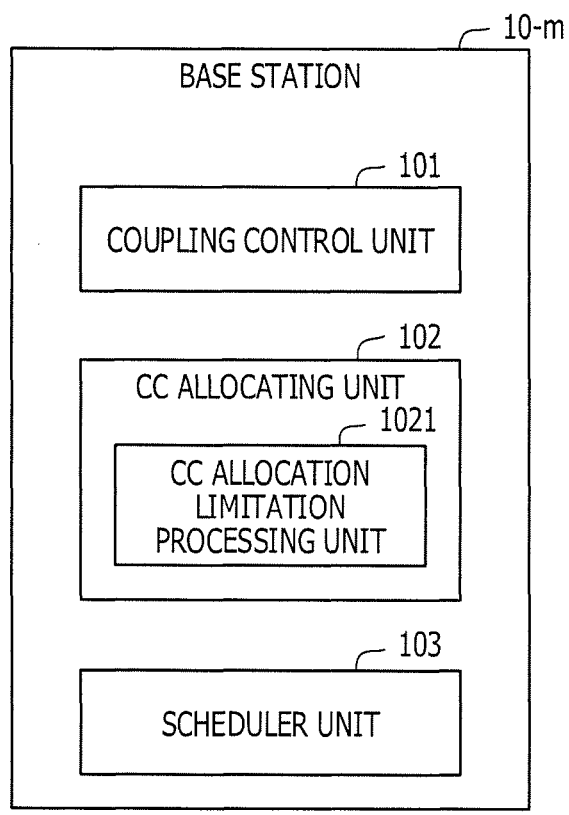
FIG. 7 is a block diagram representing one example of functions of the base station in FIG. 5.

Next, the functions of the base station 10-$m$ will be described. In the present example, the functions of the base station 10-$m$ include a coupling control unit 101, a CC allocating unit 102, and a scheduler unit 103 as represented in FIG. 7. In the present example, functions of the coupling control unit 101, the CC allocating unit 102, and the scheduler unit 103 are implemented by the processing device 11, the storing device 12, and the baseband signal processing unit 14.

The coupling control unit 101 executes processing of terminating a message in accordance with a given communication protocol used for communications between the base station 10-$m$ and the radio equipment 20-$n$. The communication protocol is a radio resource control (RRC) protocol for example.

The coupling control unit 101 acquires the quality of communications by the CC about each CC, included in a measurement report received from each piece of radio equipment 20 located in the cell formed by the base station 10-$m$. In the present example, the coupling control unit 101 uses the RSRP as the parameter representing the quality of communications. The coupling control unit 101 may use a parameter different from the RSRP (for example, RSRQ, CQI, SINR, or the like) as the parameter representing the quality of communications.

The CC allocating unit 102 allocates the CC to each piece of radio equipment 20 located in the cell provided by the base station 10-$m$. Details of the functions of the CC allocating unit 102 will be described later.

The scheduler unit 103 executes scheduling processing on each piece of radio equipment 20 located in the cell provided by the base station 10-$m$. The scheduling processing includes processing of allocating, to each piece of radio equipment 20, the radio resource included in the CC allocated to the radio equipment 20.

The base station 10-$m$ communicates with the radio equipment 20 located in the cell provided by the base station 10-$m$ by using the radio resource allocated to this radio equipment 20 by the scheduler unit 103.

A description will be added about the functions of the CC allocating unit 102. In the present example, the CC allocating unit 102 includes a CC allocation limitation processing unit 1021 as represented in FIG. 7.

In the present example, on the basis of the load of communications by each of plural CCs provided by the base station 10-$m$, the CC allocation limitation processing unit 1021 limits the CC permitted to be allocated to the radio equipment 20 among the plural CCs. The "limitation of the CC" is one example of allocation control of the CC. The "allocation control of the CC" may be referred to as "scheduling of the CC." The CC allocating unit 102 and the scheduler unit 103 may form one functional unit.

In the present example, if a given limitation condition about the load of communications by the CC is satisfied, the CC allocation limitation processing unit 1021 does not permit allocation of this CC to the radio equipment 20.

In the present example, the CC allocation limitation processing unit 1021 uses the number of pieces of radio equipment 20 to which the CC is allocated as the parameter representing the load of communications by the CC. The number of pieces of radio equipment 20 to which the CC is allocated may be represented as the number of pieces of equipment.

In the present example, the limitation condition about the load of communications by CC #i is a condition that such CC #j exists that a value obtained by subtracting the number $N_{UEj}$ of pieces of equipment about CC #j different from CC #i from the number $N_{UEi}$ of pieces of equipment about CC #i is larger than a given threshold $\alpha$. CC #i represents the i-th CC. i represents each integer from 1 to $N_{cc}$. $N_{cc}$ represents the number of CCs provided by the base station 10-$m$. In the present example, $N_{cc}$ represents an integer equal to or larger than 2. j represents each integer from 1 to $N_{cc}$ different from i. In the present example, the threshold $\alpha$ is equal to or larger than 0. The value $N_{UEi}-N_{UEj}$ obtained by subtracting the number $N_{UEj}$ of pieces of equipment about CC #j different from CC #i from the number $N_{UEi}$ of pieces of equipment about CC #i may be represented as the equipment-number difference $N_{UEi}-N_{UEj}$.

The CC allocating unit 102 allocates, with higher priority, the CC whose quality of communications is higher among the CCs permitted to be allocated to the radio equipment 20 by the CC allocation limitation processing unit 1021 to the radio equipment 20.

As described above, in the present example, the quality of communications by the CC is acquired by the coupling control unit 101. In the present example, the CC allocating unit 102 uses the RSRP of communications by the CC as the parameter representing the quality of communications by this CC.

In the present example, the CC allocating unit 102 allocates, to the radio equipment 20, the CC whose RSRP for this radio equipment 20 is the highest among the CCs permitted to be allocated to this radio equipment 20.

The CC allocating unit 102 is one example of a control unit.

(Operation)

One example of the operation of the radio communication system 1 will be described with reference to FIG. 8 to FIG. 11.

Figure 8:
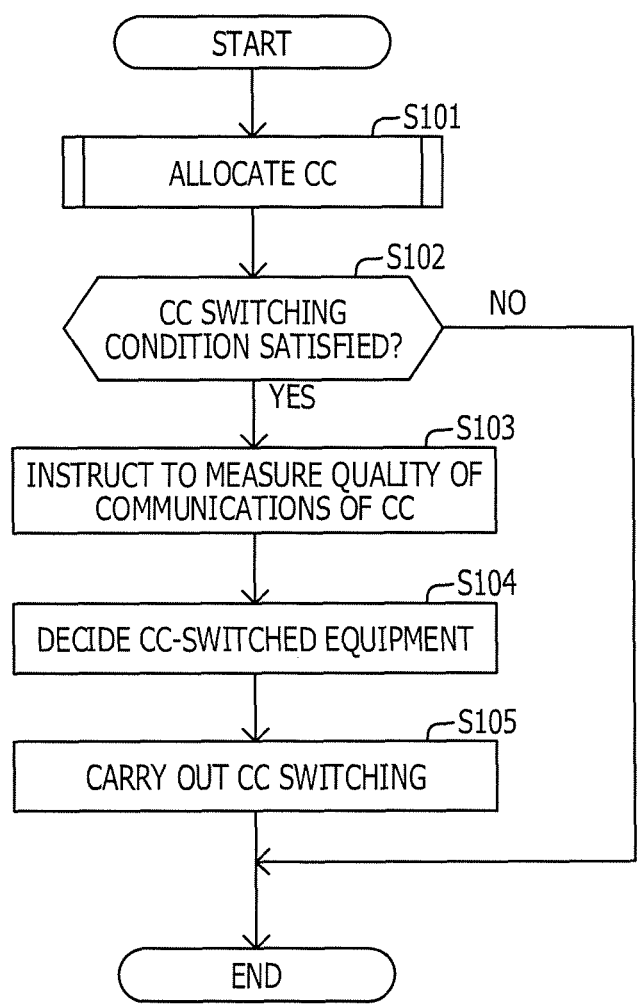
FIG. 8 is a flowchart representing one example of processing executed by the base station in FIG. 5.

In the present example, the base station 10-$m$ executes processing represented by a flowchart of FIG. 8 every time a given cycle elapses.

In the present example, the base station 10-$m$ allocates the CC provided by this base station 10-$m$ to each piece of radio equipment 20 located in a cell formed by this base station 10-$m$ (step S101 in FIG. 8). In the present example, in the step S101 in FIG. 8, the base station 10-$m$ executes processing represented by a flowchart in FIG. 9.

A description will be added below about the processing represented in FIG. 9.

Figure 9:
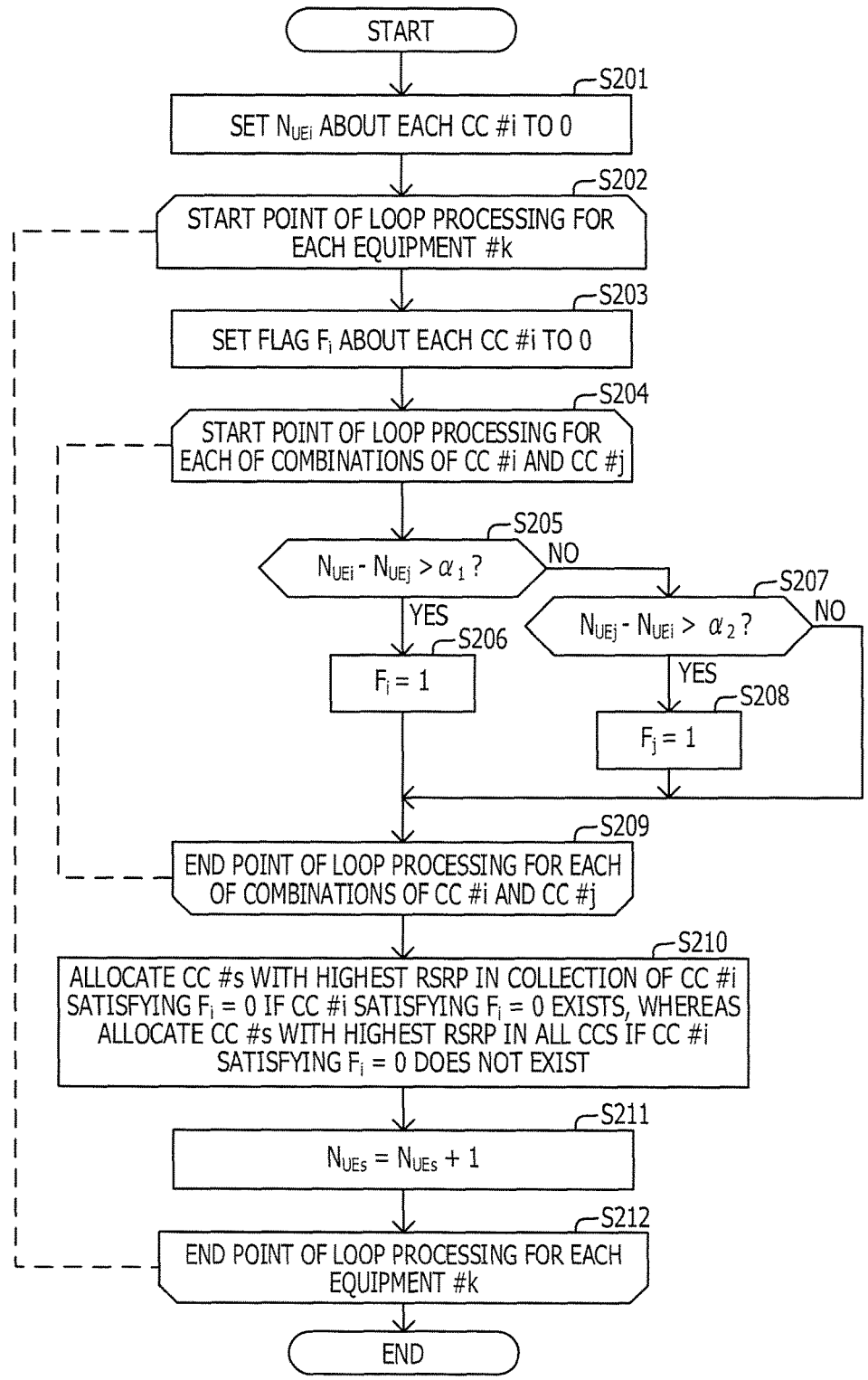
FIG. 9 is a flowchart representing one example of processing executed by the base station in FIG. 5.

The base station 10-$m$ sets the number of pieces of equipment about each of $N_{cc}$ CCs to 0 (step S201 in FIG. 9). In other words, the base station 10-$m$ sets the number $N_{UEi}$ of pieces of equipment about each CC #i to 0.

Next, the base station 10-$m$ sequentially executes $N_u$ rounds of loop processing each associated with a respective one of $N_u$ pieces of radio equipment 20 located in the cell formed by this base station 10-$m$. Each of the $N_u$ rounds of loop processing may be represented as loop processing for each equipment #k.

$N_u$ represents the number of pieces of radio equipment 20 located in the cell formed by the base station 10-$m$. k represents each integer from 1 to $N_u$. In the present example, equipment #k represents the k-th radio equipment 20. In the present example, the start point of the loop processing for each equipment #k is a step S202 and the end point of the loop processing for each equipment #k is a step S212.

A description will be added about the loop processing for each equipment #k.

The base station 10-$m$ sets a flag about each of the $N_{cc}$ CCs (in other words, flag $F_i$ about each CC #i) to 0 (step S203 in FIG. 9). When being set to 0, the flag $F_i$ represents that allocation of CC #i to the radio equipment 20 is permitted. When being set to 1, the flag $F_i$ represents that allocation of CC #i to the radio equipment 20 is not permitted.

Subsequently, the base station 10-$m$ sequentially executes $N_c$ rounds of loop processing each associated with a respective one of combinations of two CCs selected from the $N_{cc}$ CCs provided by this base station 10-$m$. The two CCs forming the combination may be represented as CC #i and CC #j. Each of the $N_c$ rounds of loop processing may be represented as loop processing for each of the combinations of CC #i and CC #j.

$N_c$ represents the number of combinations of the two CCs selected from the $N_{cc}$ CCs provided by the base station 10-$m$. In the present example, $N_c$ represents an integer equal to $N_{cc}!/\{2!(N_{cc}-2)!\}$. In the present example, the start point of the loop processing for each of the combinations of CC #i and CC #j is a step S204 and the end point of the loop processing for each of the combinations of CC #i and CC #j is a step S209.

A description will be added about the loop processing for each of the combinations of CC #i and CC #j.

The base station 10-$m$ determines whether or not a value obtained by subtracting the number $N_{UEj}$ of pieces of equipment about CC #j different from CC #i from the number $N_{UEi}$ of pieces of equipment about CC #i (in other words, equipment-number difference $N_{UEi}-N_{UEj}$) is larger than a given threshold $\alpha_1$ (step S205 in FIG. 9).

If the equipment-number difference $N_{UEi}-N_{UEj}$ is larger than the threshold $\alpha 1$, the base station 10-$m$ makes a determination result of "Yes," and sets the flag $F_i$ about CC #i to 1 (step S206 in FIG. 9) to proceed to the step S209.

On the other hand, if the equipment-number difference $N_{UEi}-N_{UEj}$ is equal to or smaller than the threshold $\alpha_1$, the base station 10-$m$ makes a determination result of "No," and proceeds to a step S207 in FIG. 9. Then, the base station 10-$m$ determines whether or not the equipment-number difference $N_{UEj}-N_{UEi}$ is larger than a given threshold $\alpha_2$ (step S207 in FIG. 9). The threshold $\alpha_2$ may have the same value as the threshold $\alpha_1$. The threshold $\alpha_2$ may have a different value from the threshold $\alpha_1$.

If the equipment-number difference $N_{UEj}-N_{UEi}$ is larger than the threshold $\alpha_2$, the base station 10-$m$ makes a determination result of "Yes." Then, the base station 10-$m$ sets the flag $F_j$ about CC #j to 1 (step S208 in FIG. 9) and proceeds to the step S209.

On the other hand, if the equipment-number difference $N_{UEj}-N_{UEi}$ is equal to or smaller than the threshold $\alpha_2$, the base station 10-$m$ makes a determination result of "No." Then, the base station 10-$m$ proceeds to the step S209 without updating the flags $F_i$ and $F_j$.

In this manner, the base station 10-$m$ executes the loop processing for each of the combinations of CC #i and CC #j.

Then, after executing the loop processing for the combinations of the two CCs selected from the $N_{cc}$ CCs provided by the base station 10-$m$, this base station 10-$m$ proceeds to a step S210 in FIG. 9.

Subsequently, if CC #i whose flag $F_1$ is set to 0 exists, the base station 10-$m$ allocates CC #s with the highest RSRP in the collection of CC #i whose flag $F_i$ is set to 0 to equipment #k. s represents an integer from 1 to $N_{cc}$. On the other hand, if CC #i whose flag $F_i$ is set to 0 does not exist, the base station 10-$m$ allocates CC #s with the highest RSRP in the $N_{cc}$ CCs to equipment #k (step S210 in FIG. 9).

Subsequently, the base station 10-$m$ adds 1 to the number $N_{UEs}$ of pieces of equipment about CC #s allocated to equipment #k (step S211 in FIG. 9) and proceeds to the step S212.

In this manner, the base station 10-$m$ executes the loop processing for each equipment #k.

Then, after executing the $N_u$ rounds of loop processing, the base station 10-$m$ ends the processing represented in FIG. 9.

Substantially, the base station 10-$m$ determines whether or not a CC switching condition is satisfied (step S102 in FIG. 8). In the present example, the CC switching condition is a condition that such a CC exists that the number of pieces of radio equipment 20 to which the CC is allocated is equal to or larger than a given threshold.

If the CC switching condition is satisfied, the base station 10-$m$ makes a determination result of "Yes," and instructs each piece of radio equipment 20 located in the cell formed by the base station 10-$m$ to measure the quality of communications by the CC on each CC basis (step S103 in FIG. 8).

Thereafter, the base station 10-$m$ receives a measurement report from each piece of radio equipment 20 in response to the instruction and decides CC-switched equipment on the basis of the received measurement reports (step S104 in FIG. 8). The measurement report represents the quality of communications by the CC measured in the radio equipment 20-$n$ about each CC. The CC-switched equipment is the radio equipment 20-$n$ whose allocated CC is to be changed.

Then, the base station 10-$m$ carries out CC switching for the decided CC-switched equipment (step S105 in FIG. 8). The CC switching is processing of changing the allocated CC. In the present example, the CC switching includes procedure similar to HO between cells.

Thereafter, the base station 10-$m$ ends the processing represented in FIG. 8.

If the CC switching condition is not satisfied, the base station 10-$m$ makes a determination result of "No" in the step S102 in FIG. 8, and ends the processing represented in FIG. 8.

A description will be added below about a concrete example of the operation of the base station 10-$m$.

The case will be assumed in which the number of CCs provided by the base station 10-$m$ is 3 and the number of pieces of radio equipment 20 located in a cell formed by the base station 10-$m$ is 6 and the threshold $\alpha_1$ and the threshold $\alpha_2$ are 0.

Moreover, the case will be assumed in which the RSRP of each CC is measured in each piece of radio equipment 20 as represented in FIG. 10.

In this case, when the base station 10-*m* advances the processing to the start point of loop processing for equipment #1 (step S202 in FIG. 9), the numbers $N_{UEi}$ of pieces of equipment about respective CC #i are all set to 0. Therefore, as represented in FIG. 11, the equipment-number difference $N_{UE1}-N_{UE2}$ is 0. Similarly, the equipment-number difference $N_{UE2}-N_{UE3}$ and the equipment-number difference $N_{UE3}-N_{UE1}$ are also 0.

Therefore, in the loop processing for equipment #1, the base station 10-*m* sets the flag $F_i$ to 1 for none of CC #i. In other words, the base station 10-*m* permits allocation of three CCs of CC #1 to CC #3 to equipment #1.

As represented in FIG. 10, the RSRP about CC #1 measured in equipment #1 is the highest in the RSRP about respective CC #i measured in equipment #1. Therefore, in the loop processing for equipment #1, the base station 10-*m* allocates CC #1 to equipment #1 (step S210 in FIG. 9) and adds 1 to the number $N_{UE1}$ of pieces of equipment about CC #1 (step S211 in FIG. 9).

Next, when the base station 10-*m* advances the processing to the start point of loop processing for equipment #2 (step S202 in FIG. 9), the number $N_{UE1}$ of pieces of equipment about CC #1 is set to 1 and the numbers $N_{UE2}$ and $N_{UE3}$ of pieces of equipment about CC #2 and CC #3 are set to 0. Therefore, as represented in FIG. 11, the equipment-number difference $N_{UE1}-N_{UE2}$ is 1, the equipment-number difference $N_{UE2}-N_{UE3}$ is 0, and the equipment-number difference $N_{UE3}-N_{UE}$ is −1.

Therefore, in the loop processing for equipment #2, the base station 10-*m* sets the flag $F_1$ about CC #1 to 1. In other words, the base station 10-*m* permits CC #2 and CC #3 among the three CCs of CC #1 to CC #3 to be allocated to equipment #2.

As represented in FIG. 10, the RSRP about CC #3 measured in equipment #2 is higher than the RSRP about CC #2 measured in equipment #2. Therefore, in the loop processing for equipment #2, the base station 10-*m* allocates CC #3 to equipment #2 (step S210 in FIG. 9) and adds 1 to the number $N_{UE3}$ of pieces of equipment about CC #3 (step S211 in FIG. 9).

Next, when the base station 10-*m* advances the processing to the start point of loop processing for equipment #3 (step S202 in FIG. 9), the number $N_{UE2}$ of pieces of equipment about CC #2 is set to 0 and the numbers $N_{UE1}$ and $N_{UE3}$ of pieces of equipment about CC #1 and CC #3 are set to 1. Therefore, as represented in FIG. 11, the equipment-number difference $N_{UE1}-N_{UE2}$ is 1, the equipment-number difference $N_{UE2}-N_{UE3}$ is −1, and the equipment-number difference $N_{UE3}-N_{UE1}$ is 0.

Therefore, in the loop processing for equipment #3, the base station 10-*m* sets the flags $F_1$ and $F_3$ about CC #1 and CC #3 to 1. In other words, the base station 10-*m* permits CC #2 among the three CCs of CC #1 to CC #3 to be allocated to equipment #3.

Therefore, in the loop processing for equipment #3, the base station 10-*m* allocates CC #2 to equipment #3 (step S210 in FIG. 9) and adds 1 to the number $N_{UE2}$ of pieces of equipment about CC #2 (step S211 in FIG. 9).

Next, when the base station 10-*m* advances the processing to the start point of loop processing for equipment #4 (step S202 in FIG. 9), the numbers $N_{UEi}$ of pieces of equipment about respective CC #i are all set to 1. Therefore, as represented in FIG. 11, the equipment-number difference $N_{UE1}-N_{UE2}$, the equipment-number difference $N_{UE2}-N_{UE3}$, and the equipment-number difference $N_{UE3}-N_{UE1}$ are all 0.

Therefore, in the loop processing for equipment #4, the base station 10-*m* sets the flag $F_i$ to 1 for none of CC #i. In other words, the base station 10-*m* permits allocation of the three CCs of CC #1 to CC #3 to equipment #4.

As represented in FIG. 10, the RSRP about CC #1 measured in equipment #4 is the highest in the RSRP about respective CC #i measured in equipment #4. Therefore, in the loop processing for equipment #4, the base station 10-*m* allocates CC #1 to equipment #4 (step S210 in FIG. 9) and adds 1 to the number $N_{UE1}$ of pieces of equipment about CC #1 (step S211 in FIG. 9).

Next, when the base station 10-*m* advances the processing to the start point of loop processing for equipment #5 (step S202 in FIG. 9), the number $N_{UE1}$ of pieces of equipment about CC #1 is set to 2 and the numbers $N_{UE2}$ and $N_{UE3}$ of pieces of equipment about CC #2 and CC #3 are set to 1. Therefore, as represented in FIG. 11, the equipment-number difference $N_{UE1}-N_{UE2}$ is 1, the equipment-number difference $N_{UE2}-N_{UE3}$ is 0, and the equipment-number difference $N_{UE3}-N_{UE1}$ is −1.

Therefore, in the loop processing for equipment #5, the base station 10-*m* sets the flag $F_1$ about CC #1 to 1. In other words, the base station 10-*m* permits CC #2 and CC #3 among the three CCs of CC #1 to CC #3 to be allocated to equipment #5.

As represented in FIG. 10, the RSRP about CC #2 measured in equipment #5 is higher than the RSRP about CC #3 measured in equipment #5. Therefore, in the loop processing for equipment #5, the base station 10-*m* allocates CC #2 to equipment #5 (step S210 in FIG. 9) and adds 1 to the number $N_{UE2}$ of pieces of equipment about CC #2 (step S211 in FIG. 9).

Next, when the base station 10-*m* advances the processing to the start point of loop processing for equipment #6 (step S202 in FIG. 9), the number $N_{UE3}$ of pieces of equipment about CC #3 is set to 1 and the numbers $N_{UE1}$ and $N_{UE2}$ of pieces of equipment about CC #1 and CC #2 are set to 2. Therefore, as represented in FIG. 11, the equipment-number difference $N_{UE1}$ $N_{UE2}$ is 0, the equipment-number difference $N_{UE2}-N_{UE3}$ is 1, and the equipment-number difference $N_{UE3}-N_{UE1}$ is −1.

Therefore, in the loop processing for equipment #6, the base station 10-*m* sets the flags $F_1$ and $F_2$ about CC #1 and CC #2 to 1. In other words, the base station 10-*m* permits CC #3 among the three CCs of CC #1 to CC #3 to be allocated to equipment #6.

Therefore, in the loop processing for equipment #6, the base station 10-*m* allocates CC #3 to equipment #6 (step S210 in FIG. 9) and adds 1 to the number $N_{UE3}$ of pieces of equipment about CC #3 (step S211 in FIG. 9).

Incidentally, as some posit, the case will be assumed in which a base station does not limit the CC permitted to be allocated to the radio equipment 20 and allocates, with higher priority, the CC with higher RSRP to the radio equipment 20. Moreover, the case will be assumed in which the RSRP of each CC is measured in each piece of radio equipment 20 as represented in FIG. 10. In this case, the base station allocates CC #1 to each piece of radio equipment 20.

In contrast, according to the base station 10-*m* of the first embodiment, the bias in the numbers of pieces of radio equipment 20 to which the respective CCs are allocated can be suppressed. Therefore, according to the base station 10-*m* of the first embodiment, the number of pieces of radio equipment 20 whose allocated CC is changed can be reduced compared with the case in which the base station does not limit the CC permitted to be allocated to the radio equipment 20.

As described above, the base station 10-*m* of the first embodiment limits the CC permitted to be allocated to the radio equipment 20-*n* in plural CCs on the basis of the state of communications by each of the plural CCs used for CA.

This can properly select the CC allocated to the radio equipment 20-*n*. As a result, the situation in which the number of pieces of radio equipment 20 that use a specific CC becomes excessively large can be suppressed for example. Therefore, the communication throughput can be enhanced.

Furthermore, the processing load of the base station 10-*m* can be reduced compared with the case in which the allocated CC is changed after the CC is allocated. As a result, the cost of the base station 10-*m* can be reduced.

Moreover, in the base station 10-*m* of the first embodiment, the state of communications by the CC includes the load of the communications.

According to this, the CC whose load of communications is relatively low can be allocated to the radio equipment 20-*n*. This can properly select the CC allocated to the radio equipment 20-*n*. As a result, the situation in which the number of pieces of radio equipment 20 that use a specific CC becomes excessively large can be suppressed for example. Therefore, the communication throughput can be enhanced.

Moreover, the base station 10-*m* of the first embodiment allocates, to the radio equipment 20-*n*, the CC whose quality of communications is highest in the CCs permitted to be allocated with higher priority.

According to this, the CC whose quality of communications is relatively high can be allocated to the radio equipment 20-*n*. This can properly select the CC allocated to the radio equipment 20-*n*. As a result, the lowering of the quality of communications can be suppressed for example. Therefore, the communication throughput can be enhanced.

As described above, the base station 10-*m* of the first embodiment uses the number of pieces of equipment as the parameter representing the load of communications by the CC. The base station 10-*m* may use the amount of communication traffic or the transmission delay time as the parameter representing the load of communications by the CC. For example, the amount of communication traffic is the amount of data communicated by using the CC. For example, the transmission delay time is the time for which data to be communicated by using the CC is made to wait until the actual communications.

The load of communications by the CC may be represented as the degree of congestion of communications in the CC.

Furthermore, the limitation of the CC permitted to be allocated to the radio equipment 20 may be represented as exclusion of the CC from candidates of allocation to the radio equipment 20. In addition, the limitation of the CC permitted to be allocated to the radio equipment 20 may be represented as setting of the CC prohibited from being allocated to the radio equipment 20.

Moreover, limiting the CC permitted to be allocated to the radio equipment 20 in plural CCs may be represented as limiting the CC permitted to be allocated to the radio equipment 20 to the CC as part of the plural CCs.

First Modification Example of First Embodiment

Next, a radio communication system according to a first modification example of the first embodiment will be described. The radio communication system according to the first modification example of the first embodiment is different from the radio communication system according to the first embodiment in that thresholds used for limitation conditions are adjusted. A description will be made below mainly about this difference. In the description of the first modification example of the first embodiment, an object given the same symbol as the symbol used in the first embodiment is the same or substantially similar object.

In the present example, the CC allocation limitation processing unit 1021 holds a threshold $\alpha_{ij}$ and a threshold $\alpha_{ji}$ regarding each of combinations of CC #i and CC #j. In the present example, the limitation condition about the load of communications by CC #i is a condition that such CC #j exists that the equipment-number difference $N_{UEi}-N_{UEj}$ is larger than the threshold $\alpha_{ij}$. Similarly, in the present example, the limitation condition about the load of communications by CC #j is a condition that such CC #i exists that the equipment-number difference $N_{UEj}-N_{UEi}$ is larger than the threshold $\alpha_{ji}$.

Moreover, in the present example, if the limitation condition about the load of communications by CC #i is satisfied, the CC allocation limitation processing unit 1021 adds a given change amount $\Delta\alpha$ to the threshold $\alpha_{ij}$ regarding CC #i and CC #j with which the equipment-number difference $N_{UEi}-N_{UEj}$ is larger than the threshold $\alpha_{ij}$. Similarly, in the present example, if the limitation condition about the load of communications by CC #j is satisfied, the CC allocation limitation processing unit 1021 adds the change amount $\Delta\alpha$ to the threshold $\alpha_{ji}$ regarding CC #j and CC #i with which the equipment-number difference $N_{UEj}-N_{UEi}$ is larger than the threshold $\alpha_{ji}$. In the present example, the change amount $\Delta\alpha$ is larger than 0.

Figure 12:
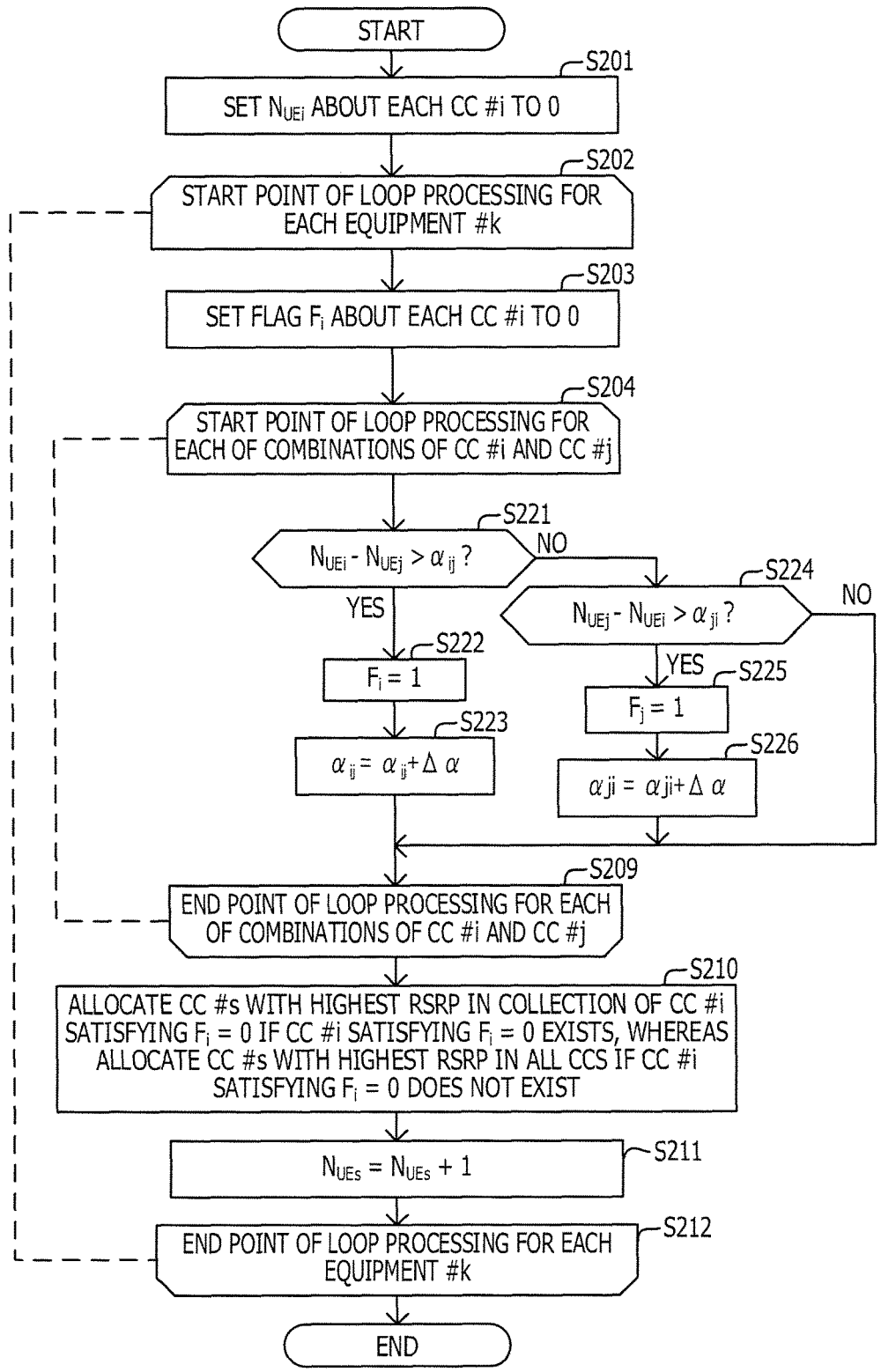
FIG. 12 is a flowchart representing one example of processing executed by a base station of a first modification example of the first embodiment.

In the present example, the base station 10-*m* executes processing represented in FIG. 12 instead of the processing represented in FIG. 9. The processing represented in FIG. 12 is processing obtained by replacing the processing from the step S205 to the step S208 in the processing represented in FIG. 9 by processing from a step S221 to a step S226.

In loop processing for each of the combinations of CC #i and CC #j, the base station 10-*m* determines whether or not the equipment-number difference $N_{UEi}-N_{UEj}$ is larger than the threshold $\alpha_{ij}$ (step S221 in FIG. 12).

If the equipment-number difference $N_{UEi}-N_{UEj}$ is larger than the threshold $\alpha_{ij}$, the base station 10-*m* makes a determination result of "Yes," and sets the flag $F_i$ about CC #i to 1 (step S222 in FIG. 12). Subsequently, the base station 10-*m* adds the change amount $\Delta\alpha$ to the threshold $\alpha_{ij}$ (step S223 in FIG. 12) and proceeds to the step S209.

On the other hand, if the equipment-number difference $N_{UEi}-N_{UEj}$ is equal to or smaller than the threshold $\alpha_{ij}$, the base station 10-*m* makes a determination result of "No," and proceeds to the step S224 in FIG. 12. Then, the base station 10-*m* determines whether or not the equipment-number difference $N_{UEj}-N_{UEi}$ is larger than the threshold $\alpha_{ji}$ (step S224 in FIG. 12).

If the equipment-number difference $N_{UEj}-N_{UEi}$ is larger than the threshold $\alpha_{ji}$, the base station 10-*m* makes a determination result of "Yes." Then, the base station 10-*m* sets the flag $F_j$ about CC #j to 1 (step S225 in FIG. 12). Subsequently, the base station 10-*m* adds the change amount $\Delta\alpha$ to the threshold $\alpha_{ji}$ (step S226 in FIG. 12) and proceeds to the step S209.

On the other hand, if the equipment-number difference $N_{UEj}-N_{UEi}$ is equal to or smaller than the threshold $\alpha_{ji}$, the base station 10-*m* makes a determination result of "No" in the step S224. Then, the base station 10-*m* proceeds to the step S209 without updating the flags $F_i$ and $F_j$.

According to this, if allocation of CC #i to the radio equipment 20-*n* is not permitted by CC #j, the probability of that allocation of CC #i to the radio equipment 20-*n* is not permitted by CC #j in the next processing can be reduced. Similarly, if allocation of CC #j to the radio equipment 20-*n* is not permitted by CC #i, the probability of that allocation of CC #j to the radio equipment 20-*n* is not permitted by CC #i in the next processing can be reduced.

In other words, according to the base station 10-*m*, ease of permission of allocation of the relevant CC to the radio equipment 20-*n* can be adjusted according to the frequency of limitation of the CC permitted to be allocated to the radio equipment 20-*n*.

As described above, according to the base station 10-*m* of the first modification example of the first embodiment, the same operation and effects as the base station 10-*m* of the first embodiment can be achieved.

Moreover, the base station 10-*m* of the first modification example of the first embodiment adjusts the threshold $\alpha_{ij}$ and the threshold $\alpha_{ji}$ so that allocation of the CC to the radio equipment 20-*n* may be permitted more readily as the frequency at which allocation of this CC to the radio equipment 20-*n* is permitted decreases.

According to this, the bias in the CCs allocated to the pieces of radio equipment 20-*n* can be suppressed. This can properly select the CC allocated to the radio equipment 20-*n*. As a result, the communication throughput can be enhanced.

Second Embodiment

Next, a radio communication system according to a second embodiment will be described. The radio communication system according to the second embodiment is different from the radio communication system according to the first embodiment in the CC allocation method. A description will be made below mainly about the difference. In the description of the second embodiment, an object given the same symbol as the symbol used in the first embodiment is the same or substantially similar object.

(Functions)

The CC allocation limitation processing unit 1021 of the second embodiment is different from the CC allocation limitation processing unit 1021 of the first embodiment in that the quality of communications by the CC is used instead of the load of communications by the CC for limitation of the CC permitted to be allocated to the radio equipment 20.

Therefore, the CC allocation limitation processing unit 1021 of the second embodiment limits the CC permitted to be allocated to the radio equipment 20 in plural CCs provided by the base station 10-*m* on the basis of the quality of communications by each of the plural CCs.

In the present example, if a given limitation condition about the quality of communications by the CC is satisfied, the CC allocation limitation processing unit 1021 does not permit allocation of this CC to the radio equipment 20.

In the present example, the CC allocation limitation processing unit 1021 uses the SINR about the CC as the parameter representing the quality of communications by this CC.

In the present example, the limitation condition about the quality of communications by CC #i is a condition that such CC #j exists that a value obtained by subtracting an SINR $R_{k,i}$ about CC #i and equipment #k from an SINR $R_{k,j}$ about CC #j different from CC #i and equipment #k is larger than a given threshold β. In the present example, the threshold β is equal to or larger than 0. The value obtained by subtracting the SINR $R_{k,i}$ about CC #i and equipment #k from the SINR $R_{k,j}$ about CC #j different from CC #i and equipment #k may be represented as the SINR difference $R_{k,j} - R_{k,i}$.

The CC allocating unit 102 of the second embodiment is different from the CC allocating unit 102 of the first embodiment in that a round-robin method is used for allocation of the CC instead of the method in accordance with the quality of communications by the CC.

Therefore, the CC allocating unit 102 of the second embodiment allocates, to the radio equipment 20, the CCs permitted to be allocated to the radio equipment 20 by the CC allocation limitation processing unit 1021 in accordance with the round-robin method.

(Operation)

One example of the operation of the radio communication system 1 will be described with reference to FIG. 8 and FIG. 13 to FIG. 15.

Figure 13:
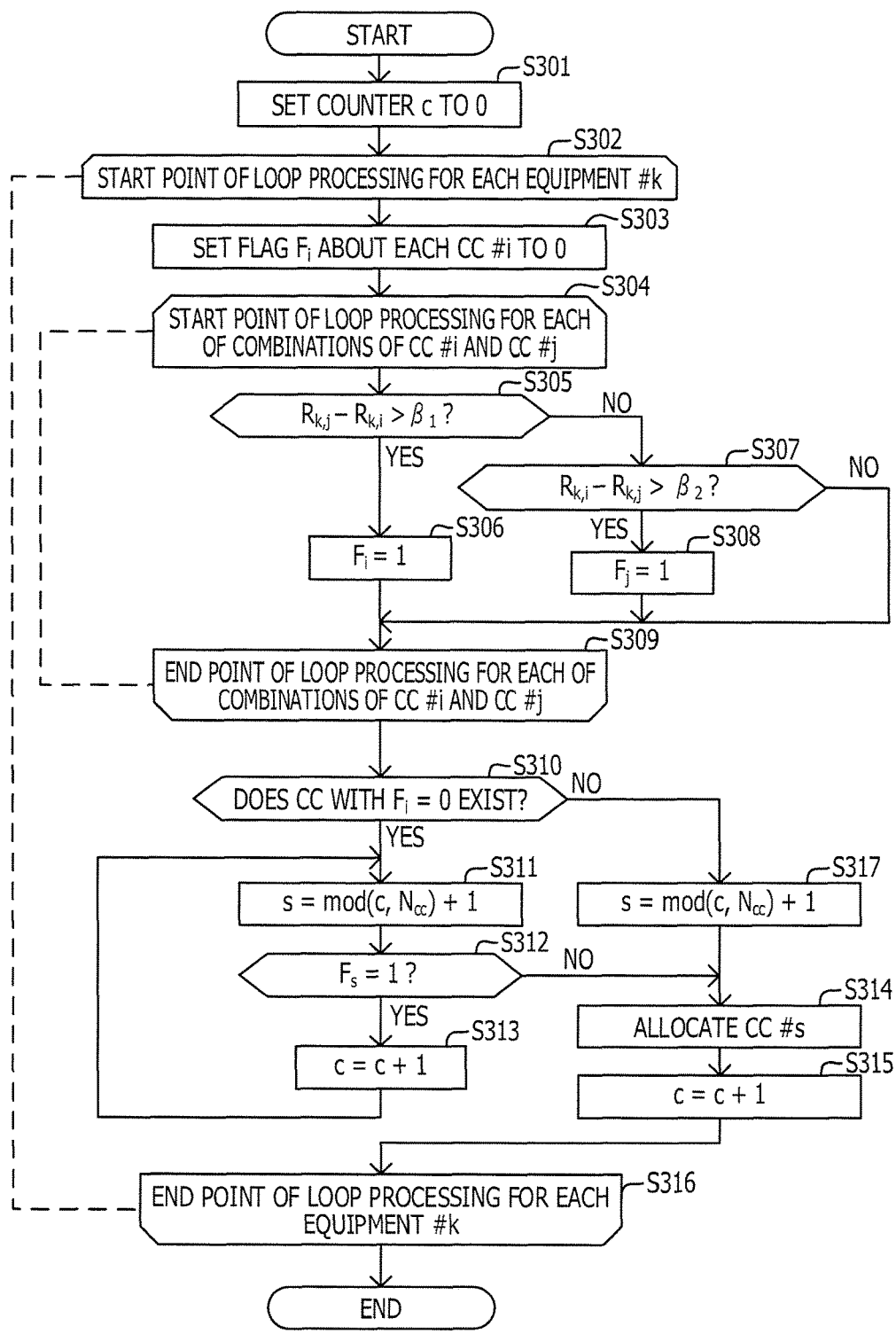
FIG. 13 is a flowchart representing one example of processing executed by a base station of a second embodiment.

The base station 10-*m* of the second embodiment is different from the base station 10-*m* of the first embodiment in that processing represented in FIG. 13 is executed in the step S101 in FIG. 8 instead of the processing represented in FIG. 9, and is different in the CC switching condition in the step S102 in FIG. 8.

In the present example, the CC switching condition used by the base station 10-*m* of the second embodiment is a condition that such a CC exists that the SINR about the CC and the radio equipment 20 to which this CC is allocated is equal to or lower than a given threshold.

In the present example, in the step S101 in FIG. 8, the base station 10-*m* executes the processing represented by a flowchart in FIG. 13.

A description will be added below about the processing represented in FIG. 13.

The base station 10-*m* sets a counter c to 0 (step S301 in FIG. 13).

Subsequently, the base station 10-*m* sequentially executes $N_u$ rounds of loop processing each associated with a respective one of $N_u$ pieces of radio equipment 20 located in a cell formed by this base station 10-*m*. In the present example, the start point of the loop processing for each equipment #k is a step S302 and the end point of the loop processing for each equipment #k is a step S316.

A description will be added about the loop processing for each equipment #k.

The base station 10-*m* sets a flag about each of $N_{cc}$ CCs (in other words, flag $F_i$ about each CC #i) to 0 (S303 in FIG. 13).

Subsequently, the base station 10-*m* sequentially executes $N_c$ rounds of loop processing each associated with a respective one of combinations of two CCs selected from the $N_{cc}$ CCs provided by this base station 10-*m*.

In the present example, the start point of the loop processing for each of the combinations of CC #i and CC #j is a step S304 and the end point of the loop processing for each of the combinations of CC #i and CC #j is a step S309.

A description will be added about the loop processing for each of the combinations of CC #i and CC #j.

The base station 10-*m* determines whether or not the SINR difference $R_{k,j} - R_{k,i}$ is larger than a given threshold $\beta_1$ (step S305 in FIG. 13).

If the SINR difference $R_{k,j} - R_{k,i}$ is larger than the threshold $\beta_1$, the base station 10-*m* makes a determination result of "Yes," and sets the flag $F_i$ about CC #i to 1 (step S306 in FIG. 13) to proceed to the step S309.

On the other hand, if the SINR difference $R_{k,j} - R_{k,i}$ is equal to or smaller than the threshold $\beta_1$, the base station 10-$m$ makes a determination result of "No," and proceeds to a step S307 in FIG. 13. Then, the base station 10-$m$ determines whether or not the SINR difference $R_{k,i}-R_{k,j}$ is larger than a given threshold $\alpha_2$ (step S307 in FIG. 13). The threshold $\beta_2$ may have the same value as the threshold $\beta_1$. The threshold $\beta_2$ may have a different value from the threshold $\beta_1$.

If the SINR difference $R_{k,i}-R_{k,j}$ is larger than the threshold $\beta_2$, the base station 10-$m$ makes a determination result of "Yes." Then, the base station 10-$m$ sets the flag $F_j$ about CC #j to 1 (step S308 in FIG. 13) and proceeds to the step S309.

On the other hand, if the SINR difference $R_{k,i}-R_{k,j}$ is equal to or smaller than the threshold $\beta_2$, the base station 10-$m$ makes a determination result of "No." Then, the base station 10-$m$ proceeds to the step S309 without updating the flags $F_i$ and $F_j$.

In this manner, the base station 10-$m$ executes the loop processing for each of the combinations of CC #i and CC #j.

Then, after executing the loop processing for the combinations of the two CCs selected from the $N_{cc}$ CCs provided by the base station 10-$m$, this base station 10-$m$ proceeds to a step S310 in FIG. 13.

Subsequently, the base station 10-$m$ determines whether or not CC #i whose flag $F_i$ is set to 0 exists (step S310 in FIG. 13).

If CC #i whose flag $F_i$ is set to 0 exists, the base station 10-$m$ makes a determination result of "Yes," and calculates a value s obtained by adding 1 to the remainder mod(c, $N_{cc}$) of division in which the counter c is divided by the number $N_{cc}$ of CCs provided by the base station 10-$m$ (step S311 in FIG. 13).

Then, the base station 10-$m$ determines whether or not the flag $F_s$ corresponding to the value s calculated in the step S311 is set to 1 (step S312 in FIG. 13).

If the flag $F_s$ is set to 1, the base station 10-$m$ makes a determination result of "Yes," and adds 1 to the counter c (step S313 in FIG. 13) to return to the step S311 in FIG. 13. Then, the base station 10-$m$ repeats the processing from the step S311 to the step S313 until a determination result of "No" is made in the step S312.

If the flag $F_s$ is set to 0, the base station 10-$m$ makes a determination result of "No" in the step S312 in FIG. 13, and allocates CC #s corresponding to the value s calculated in the step S311 to equipment #k (step S314 in FIG. 13). Subsequently, the base station 10-$m$ adds 1 to the counter c (step S315 in FIG. 13) and proceeds to the step S316.

On the other hand, if CC #i whose flag $F_1$ is set to 0 does not exist, the base station 10-$m$ makes a determination result of "No" in the step S310 in FIG. 13, and calculates the value s obtained by adding 1 to the remainder mod(c, $N_{cc}$) of division in which the counter c is divided by the number $N_{cc}$ of CCs provided by the base station 10-$m$ (step S317 in FIG. 13).

Subsequently, the base station 10-$m$ allocates CC #s corresponding to the value s calculated in the step S317 to equipment #k (step S314 in FIG. 13). Then, the base station 10-$m$ adds 1 to the counter c (step S315 in FIG. 13) and proceeds to the step S316.

In this manner, the base station 10-$m$ executes the loop processing for each equipment #k.

Then, after executing the $N_u$ rounds of loop processing, the base station 10-$m$ ends the processing represented in FIG. 13.

A description will be added below about a concrete example of the operation of the base station 10-$m$.

The case will be assumed in which the number of CCs provided by the base station 10-$m$ is 3 and the number of pieces of radio equipment 20 located in a cell formed by the base station 10-$m$ is 6 and the threshold $\beta_1$ and the threshold $\beta_2$ are 3.

Moreover, the case will be assumed in which the SINR of each CC is measured in each piece of radio equipment 20 as represented in FIG. 14.

In this case, when the base station 10-$m$ advances the processing to the start point of loop processing for equipment #1 (step S302 in FIG. 13), the counter c is set to 0. Furthermore, as represented in FIG. 15, the SINR difference $R_{1,1}-R_{1,2}$ is −9. In addition, the SINR difference $R_{1,2}-R_{1,3}$ is 2 and the SINR difference $R_{1,3}-R_{1,1}$ is 7.

Therefore, in the loop processing for equipment #1, the base station 10-$m$ sets the flag $F_1$ about CC #1 to 1. In other words, the base station 10-$m$ permits CC #2 and CC #3 among the three CCs of CC #1 to CC #3 to be allocated to equipment #1.

Then, the base station 10-$m$ calculates 1 as the value s (step S311 in FIG. 13). Because the flag $F_1$ about CC #1 is set to 1, the base station 10-$m$ adds 1 to the counter c (step S313 in FIG. 13) and thereafter calculates 2 as the value s (step S311 in FIG. 13).

Because the flag $F_2$ about CC #2 is set to 0, the base station 10-$m$ allocates CC #2 to equipment #1 (step S314 in FIG. 13) and adds 1 to the counter c (step S315 in FIG. 13) in the loop processing for equipment #1.

Next, when the base station 10-$m$ advances the processing to the start point of loop processing for equipment #2 (step S302 in FIG. 13), the counter c is set to 2. Furthermore, as represented in FIG. 15, the SINR difference $R_{2,1}-R_{2,2}$ is −7, the SINR difference $R_{2,2}-R_{2,3}$ is 3, and the SINR difference $R_{2,3}-R_{2,1}$ is 4.

Therefore, in the loop processing for equipment #2, the base station 10-$m$ sets the flag $F_1$ about CC #1 to 1. In other words, the base station 10-$m$ permits CC #2 and CC #3 among the three CCs of CC #1 to CC #3 to be allocated to equipment #2.

Then, the base station 10-$m$ calculates 3 as the value s (step S311 in FIG. 13). Because the flag $F_3$ about CC #3 is set to 0, the base station 10-$m$ allocates CC #3 to equipment #2 (step S314 in FIG. 13) and adds 1 to the counter c (step S315 in FIG. 13) in the loop processing for equipment #2.

Next, when the base station 10-$m$ advances the processing to the start point of loop processing for equipment #3 (step S302 in FIG. 13), the counter c is set to 3. Furthermore, as represented in FIG. 15, the SINR difference $R_{3,1}-R_{3,2}$ is −4, the SINR difference $R_{3,2}-R_{3,3}$ is 2, and the SINR difference $R_{3,3}-R_{3,1}$ is 2.

Therefore, in the loop processing for equipment #3, the base station 10-$m$ sets the flag $F_1$ about CC #1 to 1. In other words, the base station 10-$m$ permits CC #2 and CC #3 among the three CCs of CC #1 to CC #3 to be allocated to equipment #3.

Then, the base station 10-$m$ calculates 1 as the value s (step S311 in FIG. 13). Because the flag $F_1$ about CC #1 is set to 1, the base station 10-$m$ adds 1 to the counter c (step S313 in FIG. 13) and thereafter calculates 2 as the value s (step S311 in FIG. 13).

Because the flag $F_2$ about CC #2 is set to 0, the base station 10-$m$ allocates CC #2 to equipment #3 (step S314 in FIG. 13) and adds 1 to the counter c (step S315 in FIG. 13) in the loop processing for equipment #3.

Next, when the base station 10-$m$ advances the processing to the start point of loop processing for equipment #4 (step S302 in FIG. 13), the counter c is set to 5. Furthermore, as represented in FIG. 15, the SINR difference $R_{4,1}-R_{4,2}$ is 1, the SINR difference $R_{4,2}-R_{4,3}$ is −1, and the SINR difference $R_{4,3}-R_{4,1}$ is 0.

Therefore, in the loop processing for equipment #4, the base station 10-$m$ sets the flag $F_i$ to 1 for none of CC #i. In other words, the base station 10-$m$ permits allocation of the three CCs of CC #1 to CC #3 to equipment #4.

Then, the base station 10-$m$ calculates 3 as the value s (step S311 in FIG. 13). Because the flag $F_3$ about CC #3 is set to 0, the base station 10-$m$ allocates CC #3 to equipment #4 (step S314 in FIG. 13) and adds 1 to the counter c (step S315 in FIG. 13) in the loop processing for equipment #4.

Next, when the base station 10-$m$ advances the processing to the start point of loop processing for equipment #5 (step S302 in FIG. 13), the counter c is set to 6. Furthermore, as represented in FIG. 15, the SINR difference $R_{5,1}-R_{5,2}$ is −1, the SINR difference $R_{5,2}-R_{5,3}$ is 1, and the SINR difference $R_{5,3}-R_{5,1}$ is 0.

Therefore, in the loop processing for equipment #5, the base station 10-$m$ sets the flag $F_i$ to 1 for none of CC #i. In other words, the base station 10-$m$ permits allocation of the three CCs of CC #1 to CC #3 to equipment #5.

Then, the base station 10-$m$ calculates 1 as the value s (step S311 in FIG. 13). Because the flag $F_1$ about CC #1 is set to 0, the base station 10-$m$ allocates CC #1 to equipment #5 (step S314 in FIG. 13) and adds 1 to the counter c (step S315 in FIG. 13) in the loop processing for equipment #5.

Next, when the base station 10-$m$ advances the processing to the start point of loop processing for equipment #6 (step S302 in FIG. 13), the counter c is set to 7. Furthermore, as represented in FIG. 15, the SINR difference $R_{6,1}-R_{6,2}$ is 0, the SINR difference $R_{6,2}-R_{6,3}$ is 0, and the SINR difference $R_{6,3}-R_{6,1}$ is 0.

Therefore, in the loop processing for equipment #6, the base station 10-$m$ sets the flag $F_i$ to 1 for none of CC #i. In other words, the base station 10-$m$ permits allocation of the three CCs of CC #1 to CC #3 to equipment #6.

Then, the base station 10-$m$ calculates 2 as the value s (step S311 in FIG. 13). Because the flag $F_2$ about CC #2 is set to 0, the base station 10-$m$ allocates CC #2 to equipment #6 (step S314 in FIG. 13) and adds 1 to the counter c (step S315 in FIG. 13) in the loop processing for equipment #6.

Incidentally, as some posit, the case will be assumed in which a base station does not limit the CC permitted to be allocated to the radio equipment 20 and allocates the CC to the radio equipment 20 in accordance with a round-robin method. Moreover, the case will be assumed in which the SINR of each CC is measured in each piece of radio equipment 20 as represented in FIG. 14. In this case, the base station allocates CC #1 to CC #3 to equipment #1 to equipment #3, respectively, and allocates CC #1 to CC #3 to equipment #4 to equipment #6, respectively.

Therefore, in this case, for example, the SINR about CC #1 allocated to equipment #1 is considerably lower than the SINRs about CC #2 and CC #3 among the SINRs measured in equipment #1.

In contrast, according to the base station 10-$m$ of the second embodiment, the situation in which the CC whose quality of communications by the CC is excessively low is allocated to the radio equipment 20 can be suppressed. Therefore, according to the base station 10-$m$ of the second embodiment, the number of pieces of radio equipment 20 whose allocated CC is changed can be reduced compared with the case in which the base station does not limit the CC permitted to be allocated to the radio equipment 20.

As described above, the base station 10-$m$ of the second embodiment limits the CC permitted to be allocated to the radio equipment 20-$n$ in plural CCs on the basis of the state of communications by each of the plural CCs used for CA.

This can properly select the CC allocated to the radio equipment 20-$n$. As a result, the lowering of the quality of communications can be suppressed for example. Therefore, the communication throughput can be enhanced.

Furthermore, the processing load of the base station 10-$m$ can be reduced compared with the case in which the allocated CC is changed after the CC is allocated. As a result, the cost of the base station 10-$m$ can be reduced.

Moreover, in the base station 10-$m$ of the second embodiment, the state of communications by the CC includes the quality of the communications.

According to this, the CC whose quality of communications is relatively high can be allocated to the radio equipment 20-$n$. This can properly select the CC allocated to the radio equipment 20-$n$. As a result, the lowering of the quality of communications can be suppressed for example. Therefore, the communication throughput can be enhanced.

Moreover, the base station 10-$m$ of the second embodiment allocates the CC for which allocation is permitted to the radio equipment 20-$n$ in accordance with a round-robin method.

According to this, the bias in the CCs allocated to the pieces of radio equipment 20-$n$ can be suppressed. As a result, the situation in which the number of pieces of radio equipment 20 that use a specific CC becomes excessively large can be suppressed. Therefore, the communication throughput can be enhanced.

As described above, the base station 10-$m$ of the second embodiment uses the SINR as the parameter representing the quality of communications by the CC. The base station 10-$m$ may use RSRP, RSRQ, CQI, or throughput estimate as the parameter representing the quality of communications by the CC.

For example, the throughput estimate is the amount of information normally transmitted per unit time in communications by the CC. The throughput estimate may be estimated on the basis of a signal representing whether or not information is normally transmitted (for example, signal representing acknowledgement (ACK) or not ACK or negative ACK (NACK)).

First Modification Example of Second Embodiment

Next, a radio communication system according to a first modification example of the second embodiment will be described. The radio communication system according to the first modification example of the second embodiment is different from the radio communication system according to the second embodiment in that thresholds used for limitation conditions are adjusted. A description will be made below mainly about this difference. In the description of the first modification example of the second embodiment, an object given the same symbol as the symbol used in the second embodiment is the same or substantially similar object.

In the present example, the CC allocation limitation processing unit 1021 decides a threshold $\beta_{ij}$ a threshold $\beta_{ji}$ regarding each of combinations of CC #i and CC #j. In the present example, the limitation condition about the quality of communications by CC #i is a condition that such CC #j exists that the SINR difference $R_{k,j}-R_{k,i}$ is larger than the threshold $\beta_{ij}$. Similarly, in the present example, the limitation condition about the quality of communications by CC #j is a condition that such CC #i exists that the SINR difference $R_{k,i}-R_{k,j}$ is larger than the threshold $\beta_{ji}$.

Figure 16:
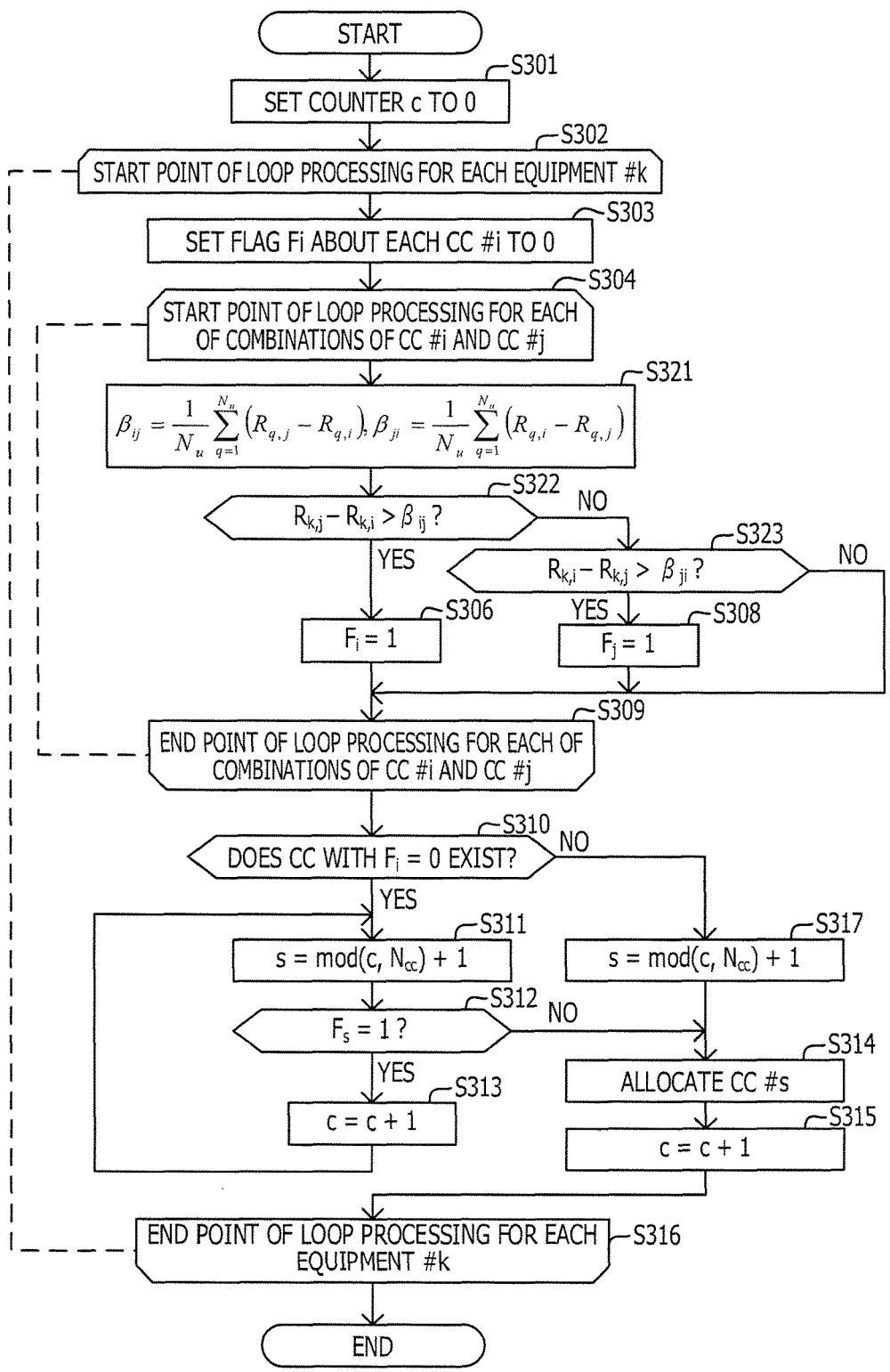
FIG. 16 is a flowchart representing one example of processing executed by a base station of a first modification example of the second embodiment.

In the present example, the base station 10-$m$ executes processing represented in FIG. 16 instead of the processing represented in FIG. 13. The processing of FIG. 16 is processing obtained by replacing the processing of the step S305 and the step S307 in the processing of FIG. 13 by processing of a step S322 and a step S323, respectively, and adding processing of a step S321 between the step S304 and the step S322.

In loop processing for each of the combinations of CC #i and CC #j, the base station 10-$m$ decides the threshold $\beta_{ij}$ and the threshold $\beta_{ji}$ regarding the combination of CC #i and CC #j (step S321 in FIG. 16). In the present example, the threshold $\beta_{ij}$ is a value obtained by averaging the SINR difference $R_{q,j} - R_{q,i}$ with respect to $N_u$ pieces of radio equipment 20 located in a cell formed by the base station 10-$m$. Similarly, in the present example, the threshold $\beta_{ji}$ is a value obtained by averaging the SINR difference $R_{q,i} - R_{q,j}$ with respect to the $N_u$ pieces of radio equipment 20 located in the cell formed by the base station 10-$m$. q represents each integer from 1 to N.

Then, the base station 10-$m$ determines whether or not the SINR difference $R_{k,j} - R_{k,i}$ is larger than the decided threshold $\beta_{ij}$ (step S322 in FIG. 16).

If the SINR difference $R_{k,j} - R_{k,i}$ is larger than the decided threshold $\beta_{ij}$, the base station 10-$m$ makes a determination result of "Yes," and sets the flag $F_i$ about CC #i to 1 (step S306 in FIG. 16) to proceed to the step S309.

On the other hand, if the SINR difference $R_{k,j} - R_{k,i}$ is equal to or smaller than the decided threshold $\beta_{ij}$, the base station 10-$m$ makes a determination result of "No," and proceeds to the step S323 in FIG. 16. Then, the base station 10-$m$ determines whether or not the SINR difference $R_{k,i} - R_{k,j}$ is larger than the decided threshold $\beta_{ji}$ (step S323 in FIG. 16).

If the SINR difference $R_{k,i} - R_{k,j}$ is larger than the decided threshold $\beta_{ji}$, the base station 10-$m$ makes a determination result of "Yes." Then, the base station 10-$m$ sets the flag $F_j$ about CC #j to 1 (step S308 in FIG. 16) and proceeds to the step S309.

On the other hand, if the SINR difference $R_{k,i} - R_{k,j}$ is equal to or smaller than the decided threshold $\beta_{ji}$, the base station 10-$m$ makes a determination result of "No." Then, the base station 10-$m$ proceeds to the step S309 without updating the flags $F_i$ and $F_j$.

As described above, according to the base station 10-$m$ of the first modification example of the second embodiment, the same operation and effects as the base station 10-$m$ of the second embodiment can be achieved.

Furthermore, the base station 10-$m$ of the first modification example of the second embodiment decides, regarding each CC, the threshold $\beta_{ij}$ and the threshold $\beta_{ij}$ on the basis of the values obtained by averaging the parameter representing the state of communications by the CC with respect to plural pieces of radio equipment 20. Moreover, regarding each piece of radio equipment 20, the base station 10-$m$ carries out the limitation of the CC permitted to be allocated to the radio equipment 20 on the basis of the decided threshold $\beta_{ij}$ and threshold $\beta_{ji}$ and the parameter of each CC about the piece of radio equipment 20.

According to this, when the parameter representing the state of communications by the CC is biased among CCs, the bias in the CCs allocated to the pieces of radio equipment 20-$n$ can be suppressed. This can properly select the CC allocated to the radio equipment 20-$n$. As a result, the communication throughput can be enhanced.

The cycle at which the threshold $\beta_{ij}$ and the threshold $\beta_{ji}$ are decided may be a different cycle from the cycle in the processing represented in FIG. 16. For example, the cycle at which the threshold $\beta_{ij}$ and the threshold $\beta_{ji}$ are decided may be the cycle at which the base station 10-$m$ receives a measurement report. Furthermore, the cycle at which the threshold $\beta_{ij}$ and the threshold $\beta_{ji}$ are decided may be longer than the cycle at which the base station 10-$m$ receives the measurement report.

Third Embodiment

Next, a radio communication system according to a third embodiment will be described. The radio communication system according to the third embodiment is different from the radio communication system according to the first embodiment in that the allocation system of the CC is selected from plural different methods. A description will be made below mainly about the difference. In the description of the third embodiment, an object given the same symbol as the symbol used in the first embodiment is the same or substantially similar object.

(Functions)

Figure 17:
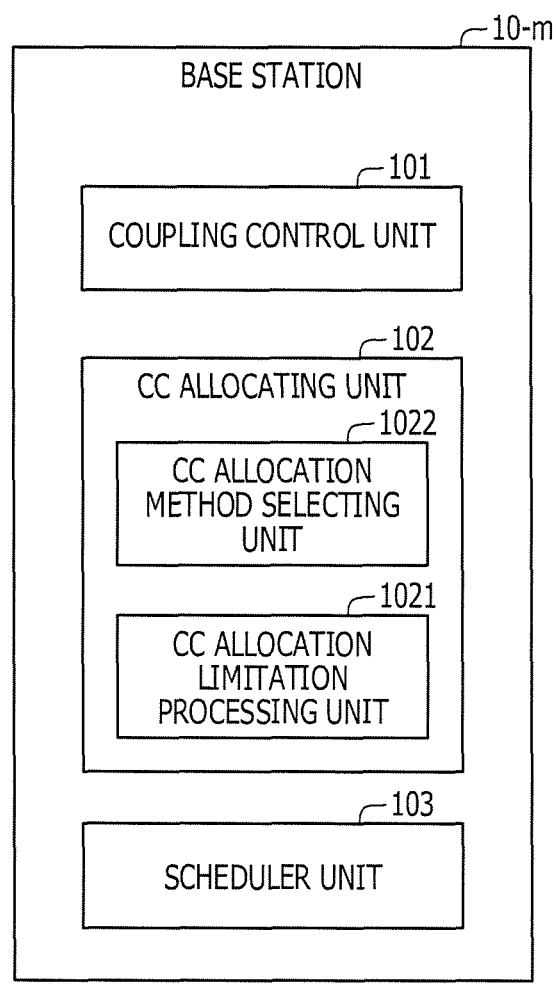
FIG. 17 is a block diagram representing one example of functions of a base station of a third embodiment.

In the present example, as represented in FIG. 17, a CC allocating unit 102 of the third embodiment includes a CC allocation method selecting unit 1022 in addition to the functions of the CC allocating unit 102 of the first embodiment.

In the present example, the CC allocation method selecting unit 1022 selects one CC allocation method from plural different CC allocation methods. The CC allocation method selecting unit 1022 may select one CC allocation method from three or more CC allocation methods.

In the present example, the plural different CC allocation methods include a first CC allocation method and a second CC allocation method.

The first CC allocation method is a method used for allocation of the CCs by the CC allocating unit 102 of the first embodiment.

The second CC allocation method is a method used for allocation of the CCs by the CC allocating unit 102 of the second embodiment.

The CC allocation limitation processing unit 1021 of the third embodiment functions similarly to the CC allocation limitation processing unit 1021 of the first embodiment if the first CC allocation method is selected by the CC allocation method selecting unit 1022. In other words, in this case, the CC allocation limitation processing unit 1021 of the third embodiment limits the CC permitted to be allocated to the radio equipment 20 in plural CCs provided by the base station 10-$m$ on the basis of the parameter representing the load of communications by each of the plural CCs.

Moreover, the CC allocation limitation processing unit 1021 of the third embodiment functions similarly to the CC allocation limitation processing unit 1021 of the second embodiment if the second CC allocation method is selected by the CC allocation method selecting unit 1022. In other words, in this case, the CC allocation limitation processing unit 1021 of the third embodiment limits the CC permitted to be allocated to the radio equipment 20 in plural CCs provided by the base station 10-$m$ on the basis of the parameter representing the quality of communications by each of the plural CCs.

In this manner, the CC allocation limitation processing unit 1021 of the third embodiment uses the parameter selected according to the selected CC allocation method as the parameter representing the state of communications by the CC, used for the limitation of the CC permitted to be allocated to the radio equipment 20.

The parameter (in the present example, the number of pieces of equipment) representing the load of communications by the CC is one example of the parameter according to the first CC allocation method.

The parameter (in the present example, SINR) representing the quality of communications by the CC is one example of the parameter according to the second CC allocation method.

(Operation)

One example of the operation of the radio communication system 1 will be described with reference to FIG. 18.

Figure 18:
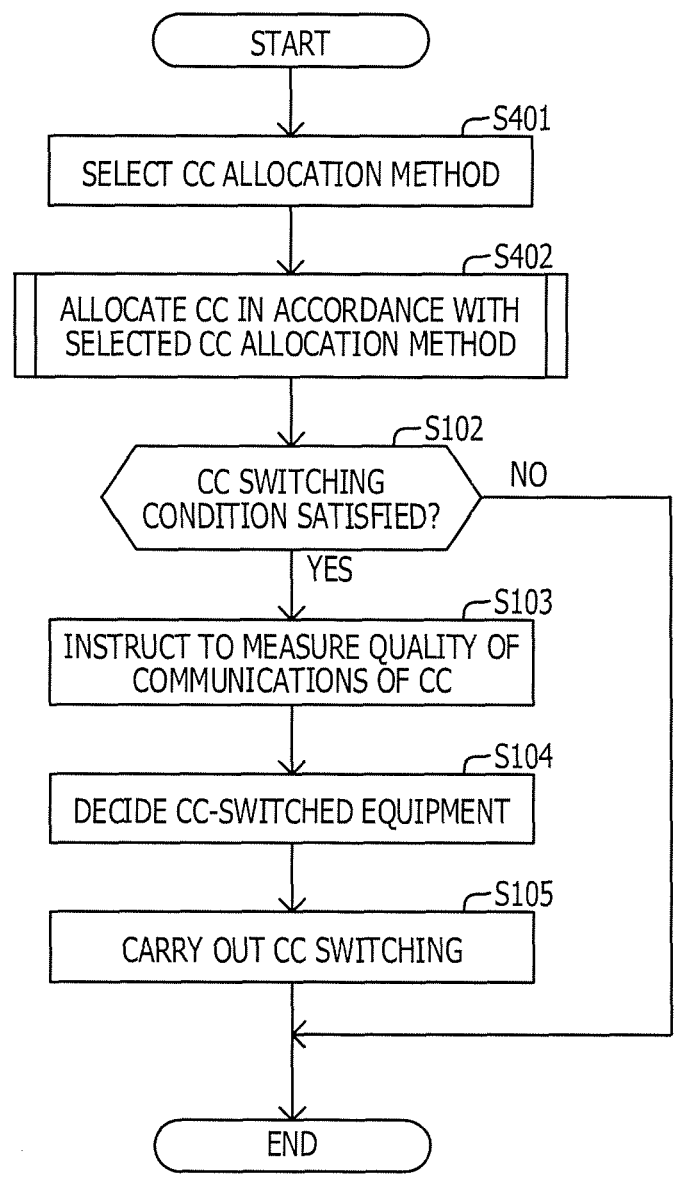
FIG. 18 is a flowchart representing one example of processing executed by the base station of FIG. 17.

The base station 10-$m$ of the third embodiment is different from the base station 10-$m$ of the first embodiment in that the base station 10-$m$ executes processing represented in FIG. 18 instead of the processing represented in FIG. 8.

The processing represented in FIG. 18 is processing obtained by replacing the step S101 in the processing represented in FIG. 8 by a step S401 and a step S402.

In the present example, the base station 10-$m$ selects one CC allocation method from plural different CC allocation methods (step S401 in FIG. 18). Subsequently, in accordance with the selected CC allocation method, the base station 10-$m$ allocates CCs provided by this base station 10-$m$ to the respective pieces of radio equipment 20 located in a cell formed by this base station 10-$m$ (step S402 in FIG. 18).

In the present example, when selecting the first CC allocation method, the base station 10-$m$ executes the processing represented by the flowchart in FIG. 9 in the step S402 in FIG. 18.

Furthermore, in the present example, when selecting the second CC allocation method, the base station 10-$m$ executes the processing represented by the flowchart in FIG. 13 in the step S402 in FIG. 18.

Thereafter, the base station 10-$m$ executes processing from a step S102 to a step S105 in FIG. 18 similarly to the processing from the step S102 to the step S105 in FIG. 8.

As described above, according to the base station 10-$m$ of the third embodiment, the same operation and effects as the base stations 10-$m$ of the first embodiment and the second embodiment can be achieved.

Furthermore, in the base station 10-$m$ of the third embodiment, the CC allocation method is selected from plural different methods. Moreover, the parameter representing the state of communications by the CC is selected according to the selected method from plural different parameters according to the plural different methods.

According to this, the CC permitted to be allocated to the radio equipment 20-$n$ is limited on the basis of the parameter selected according to the CC allocation method. This can properly select the CC allocated to the radio equipment 20-$n$. As a result, the communication throughput can be enhanced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A base station comprising:
a radio communication circuit;
a memory; and
a processor coupled to the memory and the radio communication circuit, the processor being configured to:
wirelessly communicate, through the radio communication circuit, with a plurality of terminals by using carrier aggregation,
allocate each of a plurality of component carriers to each of the plurality of terminals based on a number of terminals allocated to each component carrier and a wireless quality of each component carrier for each terminal, and
prohibit an allocation of any of the plurality of component carriers when a threshold condition regarding at least one condition for the number of terminals or a condition for the wireless quality is satisfied.

2. The base station according to claim 1, wherein for each terminal of the plurality of terminals, a component carrier to be allocated to the terminal is selected from the plurality of component carriers other than one or more component carriers in which each number of allocated terminals is relatively larger, wherein the component carrier to be allocated is selected based on the wireless quality of each component carrier for the terminal.

3. The base station according to claim 1, wherein for each terminal of the plurality of terminals, a component carrier to be allocated to the terminal is selected from the plurality of component carriers other than one or more component carriers of which each wireless quality for the terminal is relatively lower, wherein the component to be allocated to the terminal is selected using a round-robin scheme.

4. A processing method by a base station, the processing method comprising:
wirelessly communicating, through a radio communication circuit, with a plurality of terminals by using carrier aggregation;
allocating, by a processor of the base station, each of a plurality of component carriers to each of the plurality of terminals based on a number of terminals allocated to each component carrier and a wireless quality of each component carrier for each terminal; and
prohibiting, by the processor of the base station, an allocation of any of the plurality of component carriers when a threshold condition regarding at least one of a condition for the number or a condition for the wireless quality is satisfied.

5. The processing method according to claim 4, wherein for each terminal of the plurality of terminals, a component carrier to be allocated to the terminal is selected from the plurality of component carriers other than one or more component carriers in which each number of allocated terminals is relatively larger, wherein the component carrier to be allocated is selected based on the wireless quality of each component carrier for the terminal.

6. The processing method according to claim 4, wherein for each terminal of the one or more terminals, a component carrier to be allocated to the terminal is selected from the plurality of component carriers other than one or more component carriers of which each wireless quality for the terminal is relatively lower, wherein the component to be allocated to the terminal is selected using a round-robin scheme.

* * * * *